United States Patent
Wei et al.

(10) Patent No.: US 12,023,580 B2
(45) Date of Patent: Jul. 2, 2024

(54) METHOD AND APPARATUS FOR DISPLAYING PICTURE OF VIRTUAL ENVIRONMENT, DEVICE, AND MEDIUM

(71) Applicant: Tencent Technology (Shenzhen) Company Limited, Shenzhen (CN)

(72) Inventors: Jiacheng Wei, Shenzhen (CN); Jiang Yan, Shenzhen (CN); Qingchun Lu, Shenzhen (CN); Xun Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 337 days.

(21) Appl. No.: 17/514,420

(22) Filed: Oct. 29, 2021

(65) Prior Publication Data

US 2022/0096928 A1 Mar. 31, 2022

Related U.S. Application Data

(63) Continuation of application No. PCT/CN2021/115367, filed on Aug. 30, 2021.

Foreign Application Priority Data

Sep. 25, 2020 (CN) .......................... 202011022758.7

(51) Int. Cl.
*A63F 13/5252* (2014.01)
*A63F 13/55* (2014.01)
(Continued)

(52) U.S. Cl.
CPC .......... *A63F 13/5252* (2014.09); *A63F 13/55* (2014.09); *A63F 13/822* (2014.09);
(Continued)

(58) Field of Classification Search
CPC ...... A63F 13/5252; A63F 13/56; A63F 13/55; A63F 13/822; A63F 13/847;
(Continued)

(56) References Cited

U.S. PATENT DOCUMENTS

| 5,091,288 A | 2/1992 | Zappella et al. |
| 9,007,379 B1 * | 4/2015 | Shafer ..................... G06T 11/40 |
| | | 345/473 |

(Continued)

FOREIGN PATENT DOCUMENTS

| CN | 1661779 A | 8/2005 |
| CN | 101330010 A | 12/2008 |

(Continued)

OTHER PUBLICATIONS

Office Action issued on Japanese application JP2021-563699 dated Jul. 28, 2023, 2 pages.

(Continued)

*Primary Examiner* — Steve Rowland
(74) *Attorney, Agent, or Firm* — Crowell & Moring LLP

(57) ABSTRACT

This application discloses a method and apparatus for displaying a picture of a virtual environment, a device, and a medium, and relates to the field of virtual environments. The method includes: displaying a first virtual environment picture, the first virtual environment picture being a picture obtained by observing the virtual environment by using a first observation position as an observation center, the first virtual environment picture displaying a master virtual character at a first position in the virtual environment, and the first observation position being determined according to the first position; displaying a second virtual environment picture, the second virtual environment picture being a picture obtained by observing the virtual environment by using a second observation position as the observation center, the (Continued)

second virtual environment picture displaying the master virtual character at a second position and a target virtual character at a third position, and the second observation position being determined according to the second position; and displaying a third virtual environment picture in response to that the second virtual environment picture displays the target virtual character, the third virtual environment picture being a picture obtained by observing the virtual environment by using a third observation position as the observation center, the third virtual environment picture displaying the master virtual character at the second position and the target virtual character at the third position, and the third observation position being determined according to the second position and the third position. The method may display a virtual character more completely on a virtual environment picture.

20 Claims, 11 Drawing Sheets

(51) Int. Cl.
  *A63F 13/822* (2014.01)
  *G06T 15/06* (2011.01)
  *G06T 19/20* (2011.01)
  *A63F 13/847* (2014.01)

(52) U.S. Cl.
  CPC .............. *G06T 15/06* (2013.01); *G06T 19/20* (2013.01); *A63F 13/847* (2014.09); *A63F 2300/6669* (2013.01); *A63F 2300/807* (2013.01); *G06T 2210/21* (2013.01); *G06T 2219/2016* (2013.01)

(58) Field of Classification Search
  CPC ...... A63F 2300/6669; A63F 2300/8076; A63F 2300/807; G06T 15/06; G06T 19/20; G06T 2210/21; G06T 2219/2016
  See application file for complete search history.

(56) References Cited

U.S. PATENT DOCUMENTS

| | | | |
|---|---|---|---|
| 11,383,165 B2 | 7/2022 | Shao et al. | |
| 11,446,566 B2 | 9/2022 | Shao et al. | |
| 2005/0266921 A1* | 12/2005 | Hayashida | A63F 13/10 463/33 |
| 2007/0270215 A1* | 11/2007 | Miyamoto | A63F 13/45 463/32 |
| 2008/0143722 A1* | 6/2008 | Pagan | A63F 13/10 345/427 |
| 2009/0247250 A1* | 10/2009 | Kato | A63F 13/5258 463/2 |
| 2011/0244956 A1* | 10/2011 | Sakakibara | A63F 13/213 463/31 |
| 2012/0001944 A1 | 1/2012 | Sakurai et al. | |
| 2012/0214591 A1* | 8/2012 | Ito | A63F 13/211 463/31 |
| 2014/0004921 A1* | 1/2014 | Higbie | A63F 13/80 463/16 |
| 2014/0038708 A1* | 2/2014 | Davison | A63F 13/69 463/31 |
| 2014/0267221 A1 | 9/2014 | Paquet et al. | |
| 2015/0258439 A1* | 9/2015 | Prosin | A63F 13/00 463/31 |
| 2015/0273333 A1* | 10/2015 | Ciszewski | A63F 13/47 463/31 |
| 2016/0354692 A1 | 12/2016 | Matsuura | |
| 2017/0301135 A1* | 10/2017 | Jagnow | G06T 19/003 |
| 2018/0160049 A1* | 6/2018 | Aizawa | H04N 23/69 |
| 2019/0080495 A1* | 3/2019 | Andronikos | G06T 11/60 |
| 2019/0325650 A1* | 10/2019 | Milz | H04N 23/54 |
| 2020/0293176 A1* | 9/2020 | Yoganandan | G06F 3/04815 |
| 2020/0357163 A1* | 11/2020 | Wang | G06F 3/04815 |
| 2021/0117070 A1* | 4/2021 | Muta | A63F 13/422 |
| 2021/0339138 A1 | 11/2021 | Shao et al. | |
| 2021/0362042 A1 | 11/2021 | Shao et al. | |
| 2022/0047945 A1 | 2/2022 | Wei et al. | |
| 2022/0047946 A1 | 2/2022 | Hu et al. | |
| 2022/0047947 A1* | 2/2022 | Kmita | A63F 13/537 |
| 2022/0109794 A1* | 4/2022 | Takahashi | H04N 23/61 |
| 2022/0261953 A1* | 8/2022 | Li | G06T 3/40 |

FOREIGN PATENT DOCUMENTS

| | | |
|---|---|---|
| CN | 102136484 A | 7/2011 |
| CN | 103258719 A | 8/2013 |
| CN | 106527682 A | 3/2017 |
| CN | 109675307 A | 4/2019 |
| CN | 109675308 A | 4/2019 |
| CN | 111282266 A | 6/2020 |
| CN | 111467802 A | 7/2020 |
| CN | 112169330 A | 1/2021 |
| CN | 112652540 A | 4/2021 |
| JP | 2010-252932 A | 11/2010 |

OTHER PUBLICATIONS

Translation of JP2021-563699 office action.
International Search Report for PCT application PCT/CN2021/115367 dated Aug. 30, 2021, 11 pages.
Game Design 236 Tips; Game Mechanics, Card Design and Lens Tricks, Nov. 30, 2015, pp. 570-572.
Supplementary European Search Report on European application No. 21786738.1 dated Oct. 21, 2022, 8 pages.
Office Action issued on Korean application KR10-2021-7034599 dated Sep. 6, 2023, 7 pages.
Translation of Korean Office Action KR10-2021-7034599, 8 pages.
Office Action and Written Opinion issued on Singapore application 11202111511Q dated Apr. 17, 2023, 15 pages.
International Search Report and Written Opinion of International Patent Application No. PCT/CN2021/101257 dated Aug. 30, 2021, 10 pages.
Office Action issued on Japanese Application 2021-563699 dated Jan. 17, 2023, 5 pages.
Translation of Reference D1.
Ohno, Koji, "Technology to Make 3D Games Interesting" Jun. 27, 2004.
Translated Summary of Reference D3.

* cited by examiner

METHOD AND APPARATUS FOR DISPLAYING PICTURE OF VIRTUAL ENVIRONMENT, DEVICE, AND MEDIUM

RELATED APPLICATION

This application is a continuation of and claims priority to International PCT Application No. PCT/CN2021/115367, filed on Aug. 30, 2021, which claims priority to Chinese Patent Application No. 202011022758.7, filed on Sep. 25, 2020, both entitled "METHOD AND APPARATUS FOR DISPLAYING PICTURE OF VIRTUAL ENVIRONMENT, DEVICE, AND MEDIUM". The above applications are herein incorporated by reference in their entireties.

FIELD OF THE TECHNOLOGY

Embodiments of this application relate to the field of computer virtual environments, and in particular, to a method and apparatus for displaying a picture of a virtual environment, a device, and a medium.

BACKGROUND OF THE DISCLOSURE

A battle game is a game in which a plurality of user accounts compete in a common scene. For example, the battle game may be a multiplayer online battle arena (MOBA) game.

In a typical MOBA game, a virtual environment picture displayed on a client may be a picture obtained by observing a virtual environment using a master virtual character as an observation center. That is, a camera is bound to a position of the master virtual character, the camera moves along with movement of the position of the master virtual character, so that the camera is always located above a side surface of the master virtual character and photographs a virtual environment picture obtained through observation from the perspective of a third-person viewing angle of the master virtual character.

According to the foregoing method, when an enemy virtual character just enters a field of view of the master virtual character, the enemy virtual character is located at an edge of the field of view, so that picture information such as a position, a state, and an action of the enemy virtual character cannot be completely displayed in the virtual environment picture.

SUMMARY

Embodiments of this application provide a method and apparatus for displaying a picture of a virtual environment, a device, and a medium, which can display an enemy virtual character more completely on a virtual environment picture. The technical solutions are as follows:

According to an aspect, a method for displaying a picture of a virtual environment is provided, performed by a computer device, the method including:

displaying a first virtual environment picture, the first virtual environment picture being a picture obtained by observing the virtual environment by using a first observation position as an observation center, the first virtual environment picture displaying a master virtual character at a first position in the virtual environment, and the first observation position being determined according to the first position;

displaying a second virtual environment picture, the second virtual environment picture being a picture obtained by observing the virtual environment by using a second observation position as the observation center, the second virtual environment picture displaying the master virtual character at a second position and a target virtual character at a third position in the virtual environment, and the second observation position being determined according to the second position; and displaying a third virtual environment picture in response to that the second virtual environment picture displays the target virtual character, the third virtual environment picture being a picture obtained by observing the virtual environment by using a third observation position as the observation center, the third virtual environment picture displaying the master virtual character at the second position and the target virtual character at the third position in the virtual environment, and the third observation position being determined according to the second position and the third position.

According to another aspect, an apparatus for displaying a picture of a virtual environment is provided, including:

a display module, configured to display a first virtual environment picture, the first virtual environment picture being a picture obtained by observing the virtual environment by using a first observation position as an observation center, the first virtual environment picture displaying a master virtual character at a first position in the virtual environment, and the first observation position being determined according to the first position;

the display module being further configured to display a second virtual environment picture, the second virtual environment picture being a picture obtained by observing the virtual environment by using a second observation position as the observation center, the second virtual environment picture displaying the master virtual character at a second position and a target virtual character at a third position in the virtual environment, and the second observation position being determined according to the second position; and the display module being further configured to display a third virtual environment picture in response to that the second virtual environment picture displays the target virtual character, the third virtual environment picture being a picture obtained by observing the virtual environment by using a third observation position as the observation center, the third virtual environment picture displaying the master virtual character at the second position and the target virtual character at the third position in the virtual environment, and the third observation position being determined according to the second position and the third position.

According to another aspect, a computer device is provided, including a processor and a memory, the memory storing at least one instruction, at least one program, a code set, or an instruction set, the at least one instruction, the at least one program, the code set, or the instruction set being loaded and executed by the processor to implement the method for displaying a picture of a virtual environment according to the foregoing aspect According to another aspect, a computer-readable storage medium is provided, storing at least one instruction, at least one program, a code set, or an instruction set, the at least one instruction, the at least one program, the code set, or the instruction set being loaded and executed by a processor to implement the method for displaying a picture of a virtual environment according to the foregoing aspect.

According to another aspect, an embodiment of this application provides a computer program product or a computer program, the computer program product or the computer program including computer instructions, the computer instructions being stored in a computer-readable storage medium. A processor of a computer device reads the computer instructions from the computer-readable storage medium, and executes the computer instructions to cause the computer device to perform the method for displaying a picture of a virtual environment provided in the foregoing optional implementations.

The technical solutions provided in the embodiments of this application produce at least the following beneficial effects:

When an enemy virtual character appears on a virtual environment picture, an observation center of the virtual environment picture is redetermined according to positions of the enemy virtual character and a master virtual character, and a virtual environment picture is obtained according to the new observation center, so that the master virtual character and the enemy virtual character may be completely displayed in the virtual environment picture, thereby improving the display completeness of the enemy virtual character in the virtual environment picture, and optimizing a display manner of a battle picture by a client.

DESCRIPTION OF EMBODIMENTS

Figure 1:
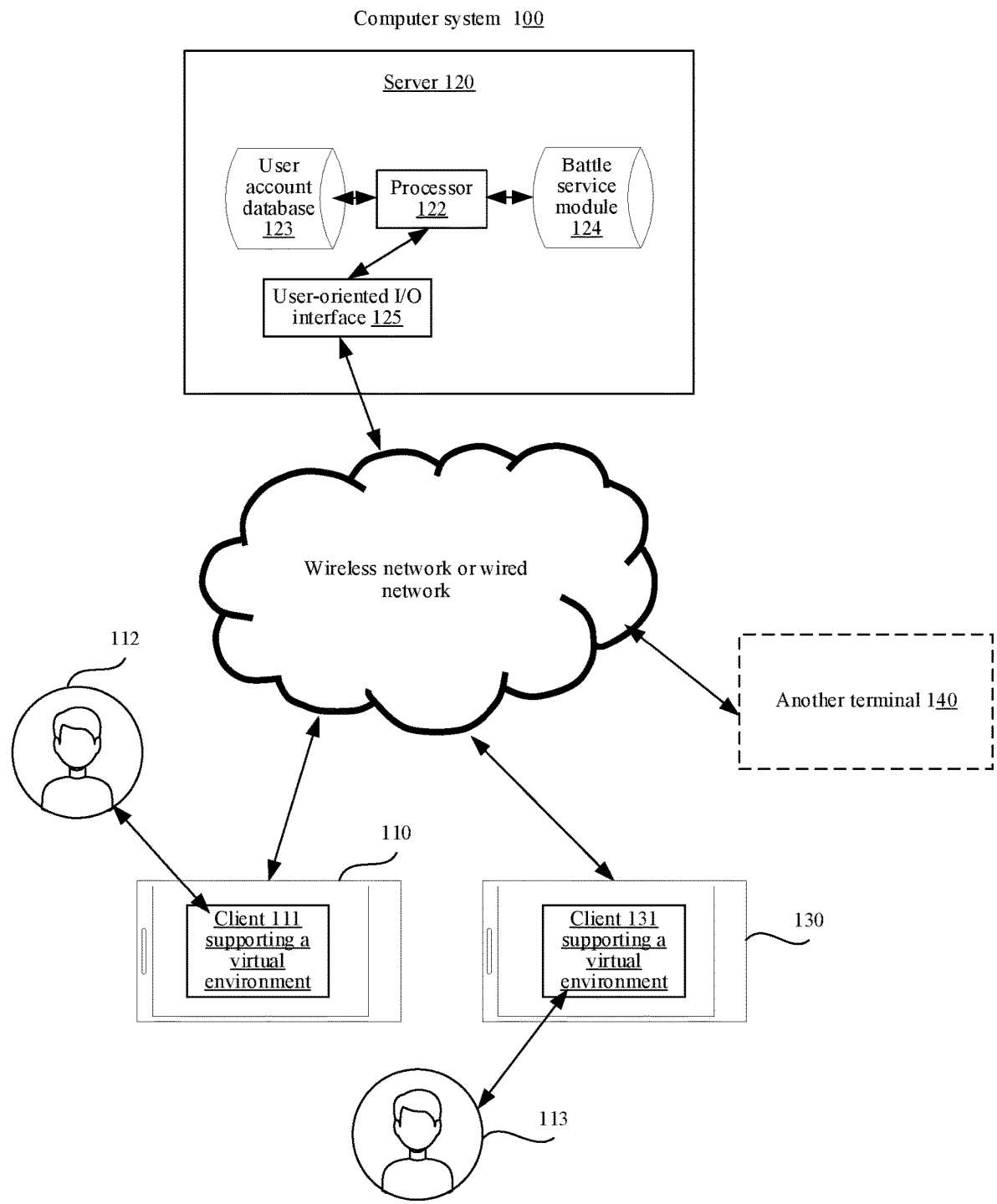
FIG. 1 is a structural block diagram of a computer system according to an exemplary embodiment of this disclosure.

To make the objectives, technical solutions, and advantages of this application clearer, the following further describes implementations of this application in detail with reference to the accompanying drawings.

First, terms involved in the embodiments of this application are briefly introduced:

Virtual environment: a virtual environment displayed (or provided) by an application program when being run on a terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment. For example, the virtual environment may be further used for a virtual environment battle between at least two virtual characters, and there may be virtual resources available to the at least two virtual characters in the virtual environment. For another example, the virtual environment includes a lower left corner region and an upper right corner region that are symmetrical. Virtual characters on two opposing sides occupy the regions respectively, and the objective of each side is to destroy a target building/fort/base/crystal deep in the opponent's region to win.

Virtual character: a movable object in the virtual environment. The movable object may be at least one of a virtual person, a virtual animal, and a cartoon person. For example, when the virtual environment is a three-dimensional virtual environment, the virtual character may be a three-dimensional model. Each virtual character has a shape and a volume in the three-dimensional virtual environment, and occupies some space in the three-dimensional virtual environment. For another example, the virtual character maybe a three-dimensional character constructed based on three-dimensional human skeleton technology. The virtual character may wear different skins to implement different appearances. In some embodiments, the virtual character may be alternatively implemented by using a 2.5-dimensional model or a two-dimensional model. This is not limited in the embodiments of this disclosure.

Multiplayer online battle arena (MOBA): different virtual teams on at least two opposing camps occupy respective map regions in the virtual environment, and compete against each other using specific victory conditions as goals. The victory conditions may include, but are not limited to at least one of occupying forts or destroying forts of the opposing camps, killing virtual characters in the opposing camps, ensuring own survivals in a specified scenario and time, seizing a specific resource, and outscoring the opponent within a specified time. The battle arena game may take place in rounds. The same map or different maps may be used in different rounds of the battle arena game. Each virtual team may include one or more virtual characters, for example, 1 virtual character, 2 virtual characters, 3 virtual characters, or 5 virtual characters.

MOBA game: a game in which several forts are provided in a virtual environment, and users on different camps control virtual characters to battle in the virtual environment, and occupy or destroy forts of the opposing camp. For example, in the MOBA game, the users may be divided into two opposing camps. The virtual characters controlled by the users are scattered in the virtual environment to compete against each other, and a victory condition is to destroy or occupy all enemy forts. The MOBA game takes place in rounds. A duration of a round of the MOBA game is from a time point at which the game starts to a time point at which the victory condition is met.

User interface (UI) control: any visual control or element that can be seen in a UI of an application program, for example, a control such as a picture, an input box, a text box, a button, or a label. Some UI controls respond to an operation of a user. For example, a movement control is configured to control a master virtual character to move. The UI controls involved in the embodiments of this disclosure include, but are not limited to: a movement control.

FIG. 1 is a structural block diagram of a computer system according to an exemplary embodiment of this application. The computer system 100 includes a first terminal 110, a server 120, and a second terminal 130.

A client 111 supporting a virtual environment is installed and run on the first terminal 110, and the client 111 may be a multiplayer online battle program. When the first terminal runs the client 111, a UI of the client 111 is displayed on a screen of the first terminal 110. The client may be any one of a military simulation program, an escape shooting game, a virtual reality (VR) application program, an augmented reality (AR) program, a three-dimensional map program, a VR game, an AR game, a first-person shooting (FPS) game, a third-person shooting (TPS) game, a MOBA game, and a simulation game (SLG). In this embodiment, an example in which the client is a MOBA game is used for description. The first terminal 110 may be a terminal used by a first user 112. The first user 112 uses the first terminal 110 to control a first virtual character located in the virtual environment to perform activities, and the first virtual character may be referred to as a master virtual character of the first user 112. The activities of the first virtual character may include, but are not limited to: at least one of adjusting body postures, crawling, walking, running, riding, flying, jumping, driving, picking, shooting, attacking, and throwing. For example, the first virtual character is a first virtual person, such as a simulated person character or a cartoon person character.

A client 131 supporting the virtual environment is installed and run on the second terminal 130, and the client 131 may be a multiplayer online battle program. When the second terminal 130 runs the client 131, a UI of the client 131 is displayed on a screen of the second terminal 130. The client may be any one of a military simulation program, an escape shooting game, a VR application program, an AR program, a three-dimensional map program, a VR game, an AR game, an FPS game, a TPS game, a MOBA game, and an SLG. In this embodiment, an example in which a client is a MOBA game is used for description. The second terminal 130 is a terminal used by a second user 113. The second user 113 uses the second terminal 130 to control a second virtual character located in the virtual environment to perform activities, and the second virtual character may be referred to as a master virtual character of the second user 113. For example, the second virtual character is a second virtual person, such as a simulated person character or a cartoon person character.

In some implementations, the first virtual person and the second virtual person may be located in the same virtual environment. For example, the first virtual person and the second virtual person may belong to the same camp, the same team, or the same organization, have a friend relationship, or have a temporary communication permission. In some implementations, the first virtual person and the second virtual person may belong to different camps, different teams, different organizations, or may have a hostile relationship.

In some implementations, the client installed on the first terminal 110 is the same as the client installed on the second terminal 130, or the clients installed on the two terminals are clients of the same type of different operating system platforms (Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 may be of the same or different device types. The device type includes and is not limited to at least one of a smartphone, a tablet computer, an e-book reader, an MP3 player, an MP4 player, a laptop portable computer, and a desktop computer.

FIG. 1 shows only two terminals. However, a plurality of other terminals 140 may access the server cluster 120 in different embodiments. In some implementations, one or more terminals 140 may be terminals corresponding to a developer. A developing and editing platform for the client to support the virtual environment may be installed on the terminal 140. The developer may edit and update the client on the terminal 140 and transmit an updated client installation package to the server 120 by using a wired or wireless network. The first terminal 110 and the second terminal 130 may download the client installation package from the server 120 to update the client.

The first terminal 110, the second terminal 130, and the another terminal 140 may be connected to the server 120 through a wireless network or a wired network.

The server 120 includes at least one of one server, a plurality of servers, a cloud computing platform, and a virtualization center. The server 120 may be configured to provide a backend service for a client supporting a three-dimensional virtual environment. In some implementations, the server 120 takes on primary computing work, and the terminals take on secondary computing work; alternatively, the server 120 takes on secondary computing work, and the terminals take on primary computing work; alternatively, collaborative computing is performed by using a distributed computing architecture between the server 120 and the terminals.

In a schematic example, the server 120 includes a processor 122, a user account database 123, a battle service module 124, and a user-oriented input/output (I/O) interface 125. The processor 122 may be configured to load instructions stored in the server 121, and process data in the user account database 123 and the battle service module 124. The user account database 123 is configured to store data of user accounts used by the first terminal 110, the second terminal 130, and/or the another terminal 140, for example, profile pictures of the user accounts, nicknames of the user accounts, combat power indices of the user accounts, and service regions where the user accounts are located. The battle service module 124 may be configured to provide a plurality of battle rooms for users to compete, such as a 1V1 battle room, a 3V3 battle room, and a 5V5 battle room. The user-oriented I/O interface 125 may be configured to establish communication with the first terminal 110 and/or the second terminal 130 by using a wireless network or wired network to exchange data.

The method for displaying a picture of a virtual environment provided in the embodiments of this disclosure is described in combination with the description of the virtual environment and the description of an implementation environment, and description is made by using an example in which an execution entity of the method is a client run on the terminal shown in FIG. 1. The terminal runs an application program, and the application program is a program supporting a virtual environment. For example, the method may be alternatively performed by another computer device.

Figure 2:
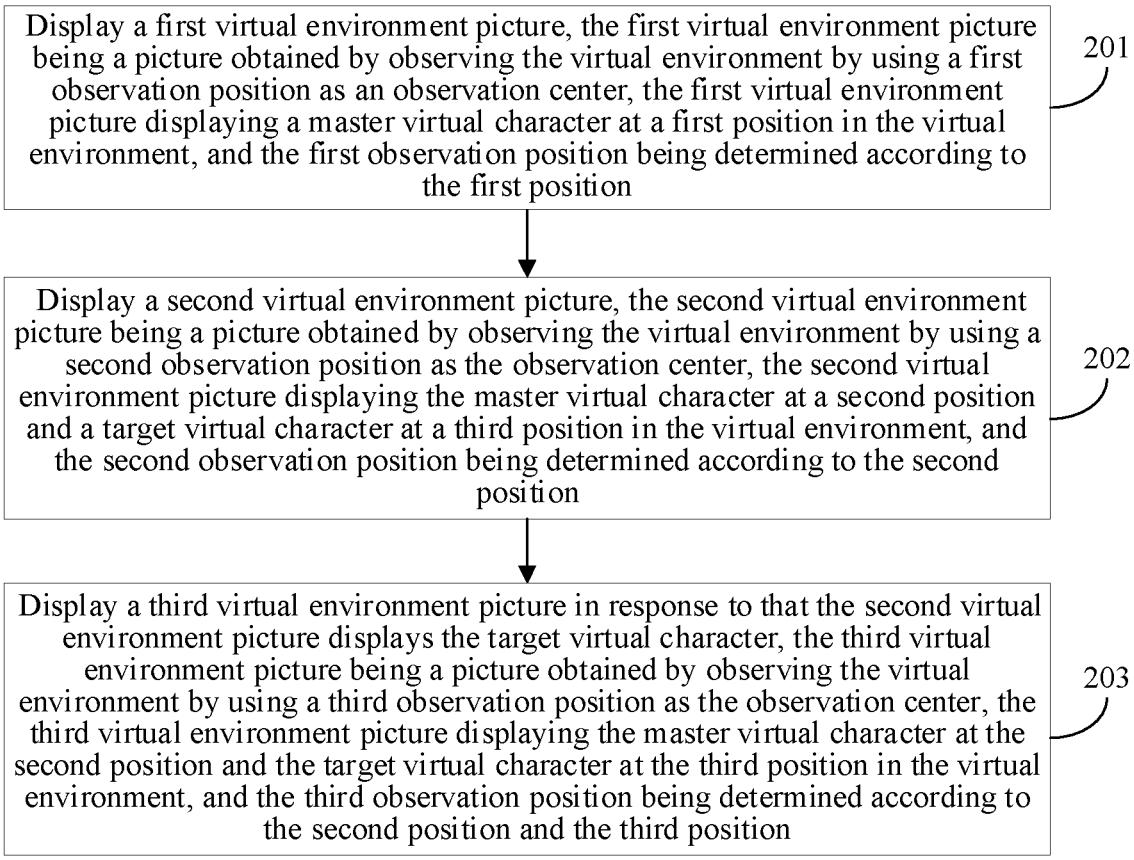
FIG. 2 is a method flowchart of a method for displaying a picture of a virtual environment according to an exemplary embodiment of this disclosure.

FIG. 2 is a flowchart of a method for displaying a picture of a virtual environment according to an exemplary embodiment of this application. The method may be performed by a client run on any terminal in FIG. 1, and the client is a client supporting a virtual environment. The method includes the following steps:

Step 201: Display a first virtual environment picture, the first virtual environment picture being a picture obtained by observing the virtual environment by using a first observation position as an observation center, the first virtual environment picture displaying a master virtual character at a first position in the virtual environment, and the first observation position being determined according to the first position.

For example, the virtual environment picture may be a two-dimensional picture that is obtained by performing picture capturing on a three-dimensional virtual environment and displayed on the client. For example, a shape of the virtual environment picture may be determined according to a shape of a display screen of the terminal or is determined according to a shape of a UI of the client. For example, the display screen of the terminal may be rectangular, the virtual environment picture may also be displayed as a rectangular picture.

The first virtual environment picture may be a virtual environment picture obtained by using the first observation position in the virtual environment as the observation center. The observation center is a center of the virtual environment picture. The observation center corresponds to an observation position in the virtual environment. For example, the virtual environment picture may be a rectangular picture, an intersection point of rectangular diagonal lines in the virtual picture may be the observation center. It is assumed that the master virtual character is located at the observation center in the virtual environment picture, a position of the master virtual character in the virtual environment may be the observation position. The observation position is a coordinate position in the virtual environment. When the virtual environment is a three-dimensional virtual environment, the observation position is three-dimensional coordinates. For example, if the ground in the virtual environment is a horizontal plane and a height coordinate of the observation position is 0, the observation position may be approximately represented as two-dimensional coordinates on the horizontal plane.

Different virtual environment pictures may be obtained from the virtual environment by using different observation positions as the observation center. The first virtual environment picture is a virtual environment picture obtained by using the first observation position as the observation center. A second virtual environment picture is a virtual environment picture obtained by using a second observation position as the observation center. A third virtual environment picture is a virtual environment picture obtained by using a third observation position as the observation center.

For example, the virtual environment may be a three-dimensional virtual environment, there may be three coordinate systems in this embodiment. First, a three-dimensional coordinate system is located in the three-dimensional virtual environment, and a two-dimensional coordinate system is located on the display screen of the terminal (namely, a two-dimensional coordinate system of a two-dimensional picture of the virtual environment picture). For example, if the ground in the virtual environment is a horizontal plane, a two-dimensional coordinate system may be further established on the ground in the three-dimensional virtual environment. For example, the three-dimensional coordinate system in the three-dimensional virtual environment may be referred to as a three-dimensional coordinate system, the two-dimensional coordinate system in the virtual environment picture is referred to as a picture coordinate system, and the two-dimensional coordinate system on the ground is referred to as a ground coordinate system. The observation center may be a coordinate position in the picture coordinate system, a coordinate position in the three-dimensional coordinate system, or a coordinate position in the ground coordinate system. For example, the observation position may be located at the center of the virtual environment picture, the center has two-dimensional coordinates on the picture coordinate system, and three-dimensional coordinates of the center in the three-dimensional coordinate system and two-dimensional coordinates of the center in the ground coordinate system may be further obtained by mapping the center into the virtual environment.

For example, the observation center may be a center position in the virtual environment picture, namely, a position in the picture coordinate system. The observation position may be a position of the observation center in the picture coordinate system mapped into the virtual environment, and may be an actual position in the virtual environment, namely, a coordinate position in the ground coordinate system or the three-dimensional coordinate system. For example, position description (a first position, a second position, and a third position) of the master virtual character and a target virtual character may be a position in the three-dimensional coordinate system or the ground coordinate system, namely, an actual position in the virtual environment rather than a position in the picture coordinate system.

The master virtual character may be a virtual character controlled by the client. The client controls the master virtual character to perform activities in the virtual environment according to a received user operation. For example, the activities of the master virtual character in the virtual environment include: walking, running, jumping, climbing, going prone, attacking, casting an ability, picking up a prop, and transmitting a message.

For example, the first position of the master virtual character in the virtual environment may be equivalent to the first observation position or another position in the virtual environment. For example, in the method for displaying a picture of a virtual environment provided in this embodiment, the virtual environment picture is set to always use the master virtual character as the observation center in a default case, and the default case refers to situation that the user does not actively perform a viewing angle movement or switching action. For example, the viewing angle movement or switching action includes at least one action of dragging a map to viewing surrounding terrains, pressing and holding a minimap to viewing a terrain of a specific position, and using another virtual character as the observation center to observe the virtual environment after the master virtual character is dead. For example, if the first virtual environment picture is a virtual environment picture obtained in the default case, the first position of the master virtual character is equivalent to the first observation position, or the first position is located around the first observation position (for example, if the head of the master virtual character is used as the observation center, a certain deviation may exist between the observation position and the position of the master virtual character); and if the first virtual environment picture has been actively moved in terms of a viewing angle by the user, the first position of the master virtual character may be not equivalent to the first observation position, and there is a relatively large distance to the first observation position.

Figure 3:
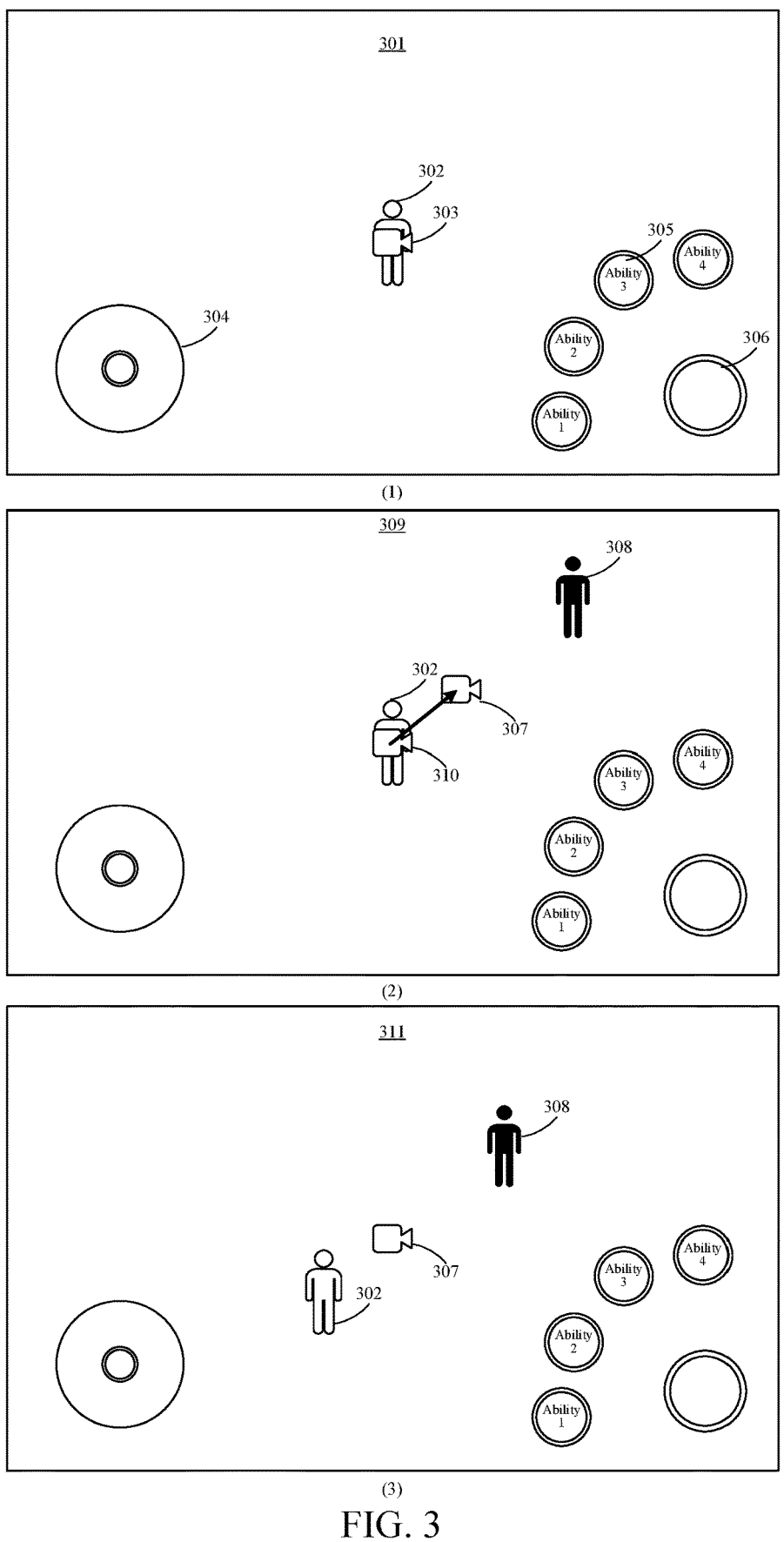
FIG. 3 is a schematic diagram of virtual environment pictures of a method for displaying a picture of a virtual environment according to another exemplary embodiment of this disclosure.

For example, as shown in (1) in FIG. 3, a first UI displayed on the client is provided. The first UI includes a first virtual environment picture 301, a master virtual character 302 is displayed on the first virtual environment picture 301, the first virtual environment picture 301 is rectangular, there is an observation center on an intersection point of rectangular diagonal lines, the observation center corresponds to a first observation position 303 in the virtual environment, and the master virtual character 302 is at a first position. For example, UI controls such as a movement control 304, an ability control 305, and an attack control 306 may be further displayed on the first virtual environment picture, where the movement control 304 is configured to control the master virtual character to move, the ability control 305 is configured to control the master virtual character to cast an ability, and the attack control 306 is configured to control the master virtual character to attack. For example, the UI controls may block a part of the first virtual environment picture 301.

Step 202: Display a second virtual environment picture, the second virtual environment picture being a picture obtained by observing the virtual environment by using a second observation position as the observation center, the second virtual environment picture displaying the master virtual character at a second position and a target virtual character at a third position in the virtual environment, and the second observation position being determined according to the second position.

For example, the second virtual environment picture may be displayed in response to that the master virtual character moves to the second position; or the second virtual environment picture is displayed in response to that the target virtual character moves to the third position.

For example, when the master virtual character moves in the virtual environment, the observation center may change along with changes of the position of the master virtual character, and a field of view on the virtual environment picture may also change along with changes of the observation center. When the master virtual character moves to the second position, the target virtual character at the third position may be displayed in the second virtual environment picture obtained by using the second observation position as the observation center. That is, the first position is not equivalent to the second position, and the first observation position is not equivalent to the second observation position.

For example, the master virtual character may alternatively stay at the original position, that is, the first position is equivalent to the second position, and the first observation position is equivalent to the second observation position. The target virtual character moves into a field of view of the first virtual environment picture, namely, the target virtual character moves to the third position to generate the second virtual environment picture.

For example, the target virtual character may be a virtual character controlled by another client, or the target virtual character may be a virtual character automatically controlled by a server or the client. For example, the target virtual character and the master virtual character belong to different camps, namely, the target virtual character and the master virtual character have a hostile relationship.

For example, an effect of completely displaying an enemy virtual character may be achieved by using only an example in which the target virtual character is the enemy virtual character in this embodiment. In other example embodiments, the target virtual character may be alternatively replaced with a target object, a target prop, or a target terrain, to achieve an effect of completely displaying the target object, the target prop, or the target terrain. For example, the target virtual character may be alternatively replaced with a turret, namely, when a turret appears in the virtual environment picture, the observation center is controlled to offset to cause the turret and the master virtual character to be completely displayed on the virtual environment picture.

For example, the first position, the second position, the third position, the first observation position, the second observation position, and a third observation position may all be coordinate positions in the virtual environment, namely, coordinate positions in the ground coordinate system or the three-dimensional coordinate system.

For example, in the default case, the master virtual character may be used as the observation center, namely, the first observation position and the second observation position are both determined according to the position of the master virtual character.

For example, in the second virtual environment picture, the target virtual character may be located at an edge position of the virtual environment picture. For example, in the second virtual environment picture, only a part of the target virtual character is displayed. For example, the second virtual environment picture only displays a lower body of the target virtual character without an upper body, or only a model of the target virtual character is displayed, and information such as a health bar and a character nickname located on the head of the target virtual character is not displayed. That is, in the second virtual environment picture, the target virtual character is not located at an optimal observation position (a center region of the picture) for the user to observe the virtual environment picture, or the second virtual environment picture cannot completely display the target virtual character.

For example, as shown in (2) in FIG. 3, the second virtual environment picture 309 displays the master virtual character 302 at the second position and the target virtual character 308 at the third position, and the second virtual environment picture 309 is a virtual environment picture obtained by using the second observation position 310 as the observation center.

The second position is the position of the master virtual character in the virtual environment. For example, if in a process from step 201 to step 202, the master virtual character does not move in the virtual environment, the second position is equivalent to the first position. When the master virtual character is used as the observation center in the default case, the second observation position being determined according to the second position refers to that: the second observation position is an observation position determined according to the second position of the master virtual character when the master virtual character is used as the observation center. For example, the second observation position is an observation position determined by using the second position as the observation center.

In an example embodiment, in step 201 and step 202, the master virtual character may be used as the observation center to generate a virtual environment picture. That is, the first observation position is an observation position determined according to the first position of the master virtual character, and the second observation position is an observation position determined according to the second position of the master virtual character.

Since the observation position is a position of a center point (that is, a center point of the virtual environment picture) of the virtual environment picture on a two-dimensional picture plane mapped into the three-dimensional virtual environment, when the master virtual character is used as the observation center, the master virtual character is located on the center point of the virtual environment picture, so that the first observation position is equivalent to the first position, and the second observation position is equivalent to the second position.

Step 203: Display a third virtual environment picture in response to that the second virtual environment picture displays the target virtual character, the third virtual environment picture being a picture obtained by observing the virtual environment by using a third observation position as the observation center, the third virtual environment picture displaying the master virtual character at the second position and the target virtual character at the third position in the virtual environment, and the third observation position being determined according to the second position and the third position.

For example, when the target virtual character appears on the second virtual environment picture, to cause the virtual environment picture to better display the target virtual character and help the user observe the target virtual character, the client may offset the observation center of the virtual environment picture, to cause a virtual environment picture obtained after the observation center is offset to better display the target virtual character.

For example, when the target virtual character appears on the second virtual environment picture, the client redetermines an observation position according to the position of the target virtual character and the position of the master virtual character, to cause the master virtual character and the target virtual character to be located in the center region (an optimal observation region) of the virtual environment picture.

For example, as shown in (2) in FIG. 3, the client may move the observation center from the second observation position 310 toward the upper right corner to the third observation position 307. As shown in (3) in FIG. 3, the third virtual environment picture 311 may be obtained by using the third observation position 307 as the observation center, and the third virtual environment picture 311 displays the master virtual character 302 at the second position and the target virtual character 308 at the third position. For example, a camera mark on the first observation position 303, the second observation position 310, and the third observation position 307 in FIG. 3 is only used for marking the observation position, and the camera mark is not displayed in an actual virtual environment picture and is not used as evidence.

For example, a manner in which the client determines the third observation position according to the second position and the third position may be implemented in various manners. For example, the client may create an offset vector pointing from the second position to the third position, and obtain the third observation position by adding the second observation position to the offset vector. The client may alternatively determine a midpoint position of the second position and the third position as the third observation position. The client may alternatively determine an offset direction according to a relative position relationship between the third position and the second position, and offset, according to a preset fixed offset distance, the second observation position toward the offset direction by the fixed offset distance to obtain the third observation position.

For example, display of the target virtual character in the third virtual environment picture is easier to observe relative to that in the second virtual environment picture. That is, relative to the second virtual environment picture, a position at which the target virtual character is displayed in the third virtual environment picture is closer to the observation center. For example, display of the target virtual character in the third virtual environment picture may be more complete relative to that in the second virtual environment picture. For example, the third virtual environment picture may display information such as an entire body model, the health bar, and the character nickname of the target virtual character; or the third virtual environment picture may display complete special effects that the target virtual character casts an ability.

For example, to help the user observe the virtual environment and prevent the picture from shaking greatly to influence watch experience of the user, movement of the observation position offsetting from the second observation position to the third observation position may be slow. That is, in the process that the observation position offsets from the second observation position to the third observation position, a plurality of frames of virtual environment pictures may be further displayed according to a plurality of intermediate position points by which the observation position passes in the offset process. The third virtual environment picture may be any virtual environment picture in the offset process of the observation position, or may be a virtual environment picture when the observation position offsets to a final position.

For example, determination of the observation center may include two parts: an observation position in the default case and an offset. The observation position in the default case is determined according to the position of the master virtual character, and the offset may include offsets generated according to a plurality of offset conditions, such as an offset generated for displaying the target virtual character more completely provided in this embodiment. For example, the offset may further include offsets generated according to other offset conditions, such as an offset of the observation center that is manually controlled by the user. For example, an example in which an offset generated by the target virtual character is a first offset, and the offset of the observation position that is manually controlled by the user is a second offset is used, a final observation position is equivalent to the observation position in the default case plus the first offset and the second offset.

For example, step 202 and step 203 in this embodiment list an ideal case. That is, the master virtual character and the target virtual character stay at the original positions, and only the observation position offsets according to the offset generated by the target virtual character, to generate different virtual environment pictures. During actual application, the observation position offsets quite slowly, the user may further control the master virtual character and the target virtual character to move in this process. The default observation position may also change due to movement of the master virtual character, the offset may also change due to movement of the target virtual character, and the client may determine a real-time observation position according to this embodiment or a method for determining an observation position provided in the following embodiment in real time, to further display a corresponding virtual environment picture.

Based on the above, according to the method provided in this embodiment, when an enemy virtual character appears on a virtual environment picture, an observation center of the virtual environment picture is redetermined according to positions of the enemy virtual character and a master virtual character, and a virtual environment picture is obtained according to the new observation center, so that the master virtual character and the enemy virtual character may be completely displayed in the virtual environment picture, for the user to observe the enemy virtual character and further control the master virtual character to perform activities, thereby improving the display completeness of the enemy virtual character in the virtual environment picture, and optimizing a display manner of a battle picture by a client. A more complete picture may enable the user to control the master virtual character to attack the enemy virtual character or control the master virtual character to dodge the enemy virtual character more accurately. Therefore, the human-computer interaction efficiency that the user controls the master virtual character may be further improved.

For example, a method for determining an offset of the observation position is provided.

Figure 4:
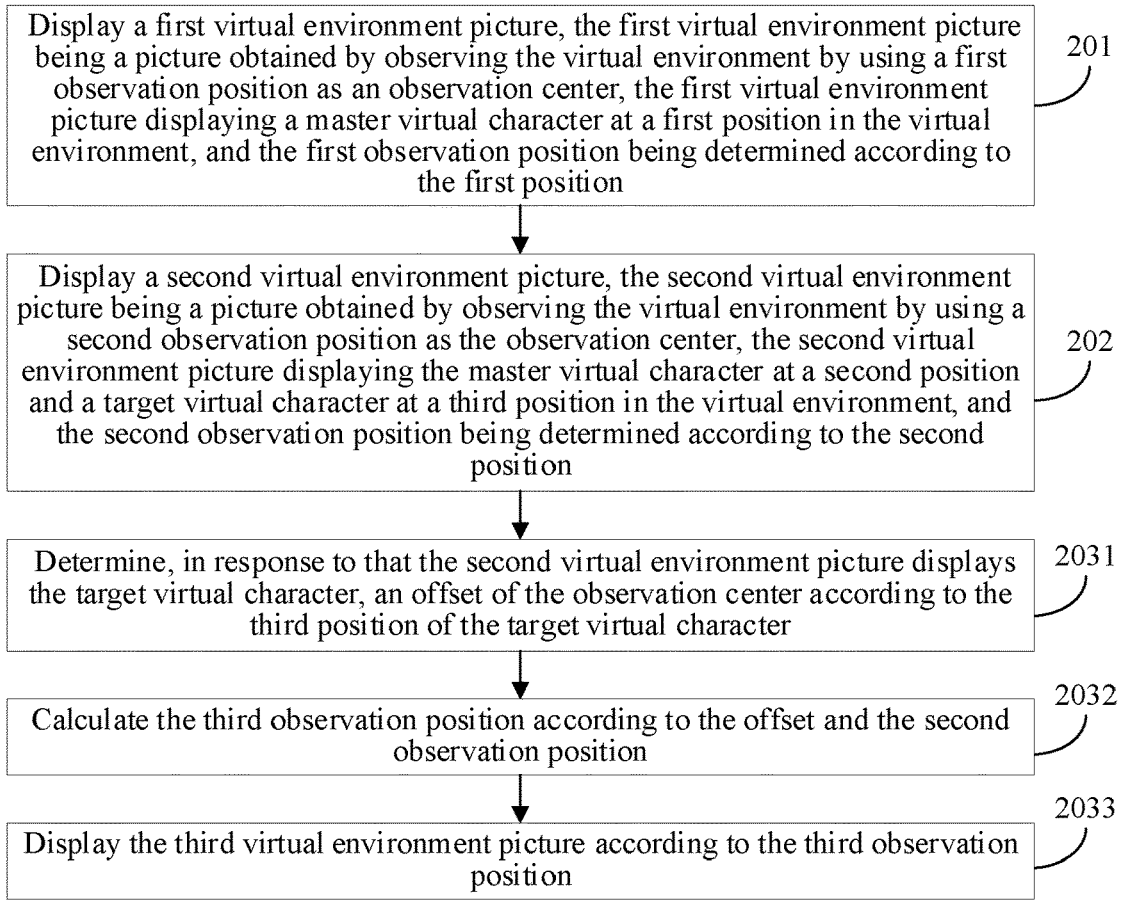
FIG. 4 is a method flowchart of a method for displaying a picture of a virtual environment according to another exemplary embodiment of this disclosure.

FIG. 4 is a flowchart of a method for displaying a picture of a virtual environment according to an exemplary embodiment of this disclosure. The method may be performed by a client run on any terminal in FIG. 1, and the client is a client supporting a virtual environment. Based on the exemplary embodiment shown in FIG. 2, step 203 includes step 2031 to step 2033.

Step 2031: Determine, in response to that the second virtual environment picture displays the target virtual character, an offset of the observation center according to the third position of the target virtual character.

For example, the client may determine the offset of the observation center according to a relative position relationship between the target virtual character and the master virtual character. For example, the offset includes an offset direction and an offset distance. For example, the offset of this embodiment refers to an offset vector, and the third observation position is obtained by adding the second observation position to the offset.

For example, the client may determine, in response to that the target virtual character is located in a target region, the offset of the observation center according to a position of the third position in the target region, the target region being a region determined according to the second position of the master virtual character.

For example, when the target virtual character may enter the target region, the client may control the observation position to offset according to a position of the target virtual character in the target region.

The target region may be a region determined by using the second position of the master virtual character as a center point. For example, the target region changes along with changes of the position of the master virtual character. For example, the target region may be a circular region using the second position of the master virtual character as a center point or a rectangular region using the second position as a center point. For example, when the target region is a circular region, a radius may be determined in various manners, e.g., according to a field of view of the virtual environment picture. For example, when the field of view of the virtual environment picture is in a shape of a rectangle, the radius of the target region may be ½ of a short side of the rectangle. For example, when the target region is a rectangular region, a length and a width of the rectangle may be determined according to the field of view of the virtual environment picture. For example, if the field of view of the virtual environment picture is rectangular, a length and a width of the target region may be equivalent to a length and a width of the virtual environment picture, or the length and the width of the virtual environment picture may be scaled according to the same ratio as the length and the width of the target region. In some implementations, the target region may be alternatively a region in another shape, such as a triangle or a trapezoid. The target region may be alternatively a region in an irregular shape, for example, target regions in different shapes may be determined for adapting to display screens in different shapes.

For example, the target region may be located within a field of view of the second virtual environment picture, or most region in the target region is located within the field of view of the second virtual environment picture.

Figure 5:
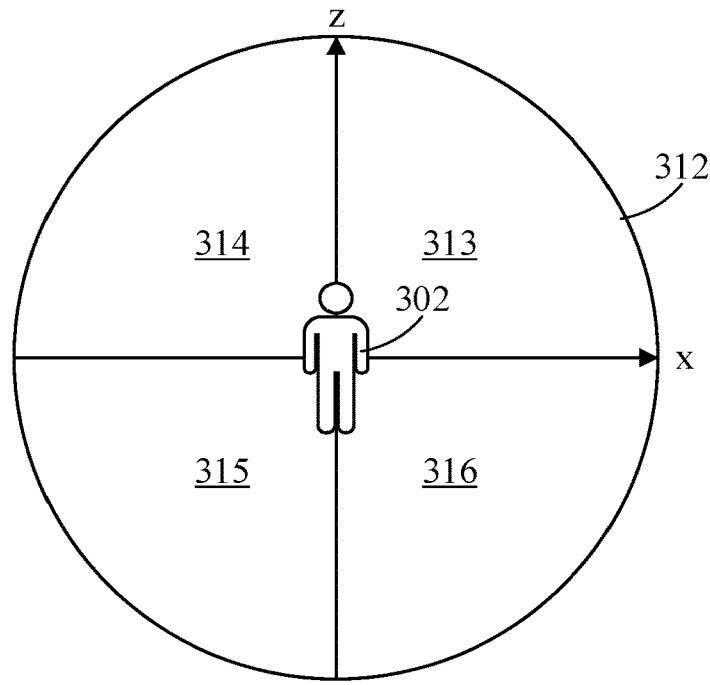
FIG. 5 is a schematic diagram of a target region according to another exemplary embodiment of this disclosure.

For example, as shown in FIG. 5, the target region 312 may be a circular region using the position of the master virtual character 302 as a center of a circle. When the target virtual character enters the target region, the client may obtain the offset of the observation center (observation position) according to the position of the target virtual character in the target region.

For example, the target region may include a region centered on the second position, and the target region may be divided into a first quadrant region, a second quadrant region, a third quadrant region, and a fourth quadrant region by a rectangular coordinate system with an x-axis and a z-axis that is established by using the second position as a coordinate origin.

For example, description is made by using an example in which the target region is a circular region or a rectangular region centered on the second position in this embodiment. For example, as shown in FIG. 5, the target region 312 is a circular region using the second position of the master virtual character 302 as a center of a circle, a rectangular coordinate system with an x-axis and a z-axis may be established by using the second position as a coordinate origin, and a first quadrant region 313 located in a first quadrant, a second quadrant region 314 located in a second quadrant, a third quadrant region 315 located in a third quadrant, and a fourth quadrant region 316 located in a fourth quadrant may be obtained.

In response to that the third position is located in a right region of the z-axis, a horizontal coordinate of the offset is determined as A, A being a positive number, the right region of the z-axis including: a positive semi-axis of the x-axis, the first quadrant region, and the fourth quadrant region. In response to that the third position is located in a left region of the z-axis, the horizontal coordinate of the offset is determined as −B, B being a positive number, the left region of the z-axis including: a negative semi-axis of the x-axis, the second quadrant region, and the third quadrant region. In response to that the third position is located in an upper region of the x-axis, a longitudinal coordinate of the offset is determined as C, C being a positive number, the upper region of the x-axis including: a positive semi-axis of the z-axis, the first quadrant region, and the second quadrant region. In response to that the third position is located in a lower region of the x-axis, the longitudinal coordinate of the offset is determined as −D, D being a positive number, the lower region of the x-axis including: a negative semi-axis of the z-axis, the third quadrant region, and the fourth quadrant region.

For example, A, B, C, and D may be preset values. That is, when the target virtual character is located on the right of the master virtual character in the target region, the horizontal coordinate of the offset may be A; when the target virtual character is located on the left of the master virtual character, the horizontal coordinate of the offset may be −B;

when the target virtual character is located on the upper of the master virtual character, the longitudinal coordinate of the offset may be C; and when the target virtual character is located on the lower of the master virtual character, the longitudinal coordinate of the offset may be −D. When the target virtual character is located on the x-axis, the longitudinal coordinate of the offset is 0; and when the target virtual character is located on the z-axis, the horizontal coordinate of the offset is 0. For example, when the target virtual character is located in the first quadrant region, the offset is (A, C).

For example, A, B, C, and D may be equal to or not equal to each other, and values thereof may be determined in various manners.

For example, the client may alternatively determine the horizontal coordinate and the longitudinal coordinate of the offset according to the second position and the third position. For example, if coordinates of the second position in the ground coordinate system are (x1, y1), and coordinates of the third position in the ground coordinate system are (x2, y2), the offset is (x2-x1, y2-y1).

For example, the offset may be alternatively determined according to coordinates of the target virtual character in the rectangular coordinate system with an x-axis and a z-axis. For example, if the coordinates of the target virtual character in the rectangular coordinate system with an x-axis and a z-axis using the master virtual character as a coordinate origin may be (x2, y2), the offset may be (x2, y2).

For example, when the target virtual character includes a plurality of virtual characters, the offset may be alternatively determined according to positions of the plurality of virtual characters in the target region.

For example, the target virtual character includes at least two virtual characters, in response to that at least one of the target virtual characters is located in the right region of the z-axis and at least one of the target virtual characters is located in the left right of the z-axis, the horizontal coordinate of the offset is determined as 0; and in response to that at least one of the target virtual characters is located in the upper region of the x-axis and at least one of the target virtual characters is located in the lower region of the x-axis, the longitudinal coordinate of the offset is determined as 0.

That is, if the plurality of target virtual characters are all located on the right of the master virtual character in the target region, the horizontal coordinate of the offset is A; if the plurality of target virtual characters are all located on the left of the master virtual character, the horizontal coordinate of the offset is −B; and if the target virtual characters are both located on the left and the right of the master virtual character, the horizontal coordinate of the offset is 0. Similarly, if the plurality of target virtual characters are all located on the upper of the master virtual character in the target region, the longitudinal coordinate of the offset is C; if the plurality of target virtual characters are all located on the lower of the master virtual character, the longitudinal coordinate of the offset is −D; and if the target virtual characters are both located on the upper and the lower of the master virtual character, the longitudinal coordinate of the offset is 0.

Step 2032: Calculate the third observation position according to the offset and the second observation position.

For example, the client obtains the third observation position according to the observation position in the current default case and the offset. That is, when the master virtual character is at the second position and the observation position in the default case is the second observation position, the client obtains the third observation position by adding the second observation position to the offset.

Step 2033: Display the third virtual environment picture according to the third observation position.

The client displays the third virtual environment picture obtained using a field of view of the third observation position according to the newly obtained third observation position, to cause the target virtual character to be displayed on the virtual environment picture more completely.

Based on the above, according to the method provided in this embodiment, when the target virtual character is displayed on the virtual environment picture, an offset may be calculated according to the position of the target virtual character, and a new observation position is calculated according to the offset and a current observation position, to obtain a virtual environment picture according to the new observation position. Since the current observation position is determined according to the position of the master virtual character, according to this method, a new observation position may be determined according to the position of the master virtual character and the position of the enemy virtual character, to cause the master virtual character and the enemy virtual character to be displayed on the virtual environment picture completely.

According to the method provided in this embodiment, a target region may be determined by using the position of the master virtual character as a center, and after the enemy virtual character enters the target region, a relative position relationship between the enemy virtual character and the master virtual character may be determined according to a position of the enemy virtual character in the target region. In this way, a direction to which the observation center offsets to cause the enemy virtual character to be displayed on the virtual environment picture completely may be determined, and the observation center may be controlled to offset to the new observation position to obtain a new virtual environment picture.

According to the method provided in this embodiment, a rectangular coordinate system may be established in the target region by using the position of the master virtual character as an origin, to divide the target region into a plurality of regions, and the offset of the observation center is further determined according to the position of the enemy virtual character in the target region to cause the observation center to offset according to the offset.

According to the method provided in this embodiment, when there are a plurality of enemy virtual characters around the master virtual character, the offset may be calculated according to positions of the virtual characters in the target region. When the enemy virtual characters both exist in a positive and negative directions of the x-axis, the observation center does not offset in the horizontal direction; and when the enemy virtual characters both exist in a positive and negative directions of the z-axis, the observation center does not offset in the longitudinal direction. As a result, each of the enemy virtual characters may be displayed completely in a virtual environment picture obtained after offsetting, so that a field of view of the master virtual character may be better optimized, thereby helping the user control the master virtual character to perform activities.

For example, the client may obtain the virtual environment picture by using a camera model disposed in the virtual environment to photograph the virtual environment.

Figure 6:
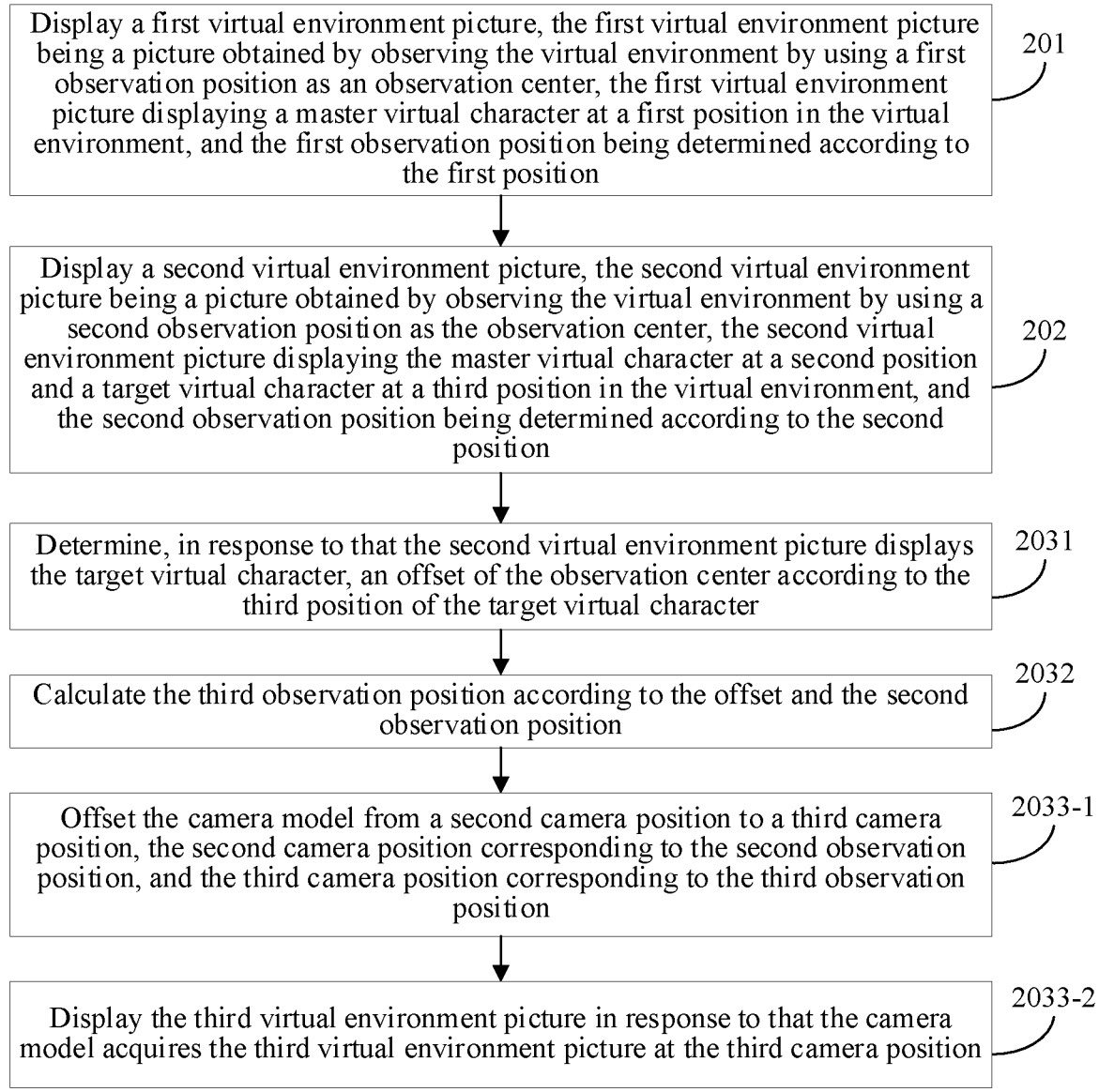
FIG. 6 is a method flowchart of a method for displaying a picture of a virtual environment according to another exemplary embodiment of this disclosure.

FIG. 6 is a flowchart of a method for displaying a picture of a virtual environment according to an exemplary embodiment of this application. The method may be performed by a client run on any terminal in FIG. 1, and the client is a client supporting a virtual environment. Based on the exemplary embodiment shown in FIG. 4, step 2033 includes step 2033-1 and step 2033-2.

Step 2033-1: Offset the camera model from a second camera position to a third camera position, the second camera position corresponding to the second observation position, and the third camera position corresponding to the third observation position.

The first virtual environment picture corresponds to a picture of the virtual environment acquired by the camera model disposed at a first camera position in the virtual environment, and the observation center corresponds to an intersection point of a ray emitted from a position of the camera model in an observation direction and the virtual environment. For example, the first virtual environment picture, the second virtual environment picture, and the third virtual environment picture may be pictures of the virtual environment acquired by the camera model disposed in the virtual environment.

For example, a camera position may refer to a horizontal coordinate position of the camera model in the three-dimensional virtual environment, or the camera position may refer to a three-dimensional coordinate position of the camera model in the three-dimensional virtual environment. The horizontal coordinate position may refer to a coordinate position on a two-dimensional plane of the horizontal plane in the three-dimensional virtual environment. For example, if the three-dimensional virtual environment includes an x-y-z three-dimensional coordinate system, the camera position may be described by using x-z two-dimensional coordinates on the horizontal plane, or the camera position may be described by using x-y-z three-dimensional coordinates.

Figure 7:
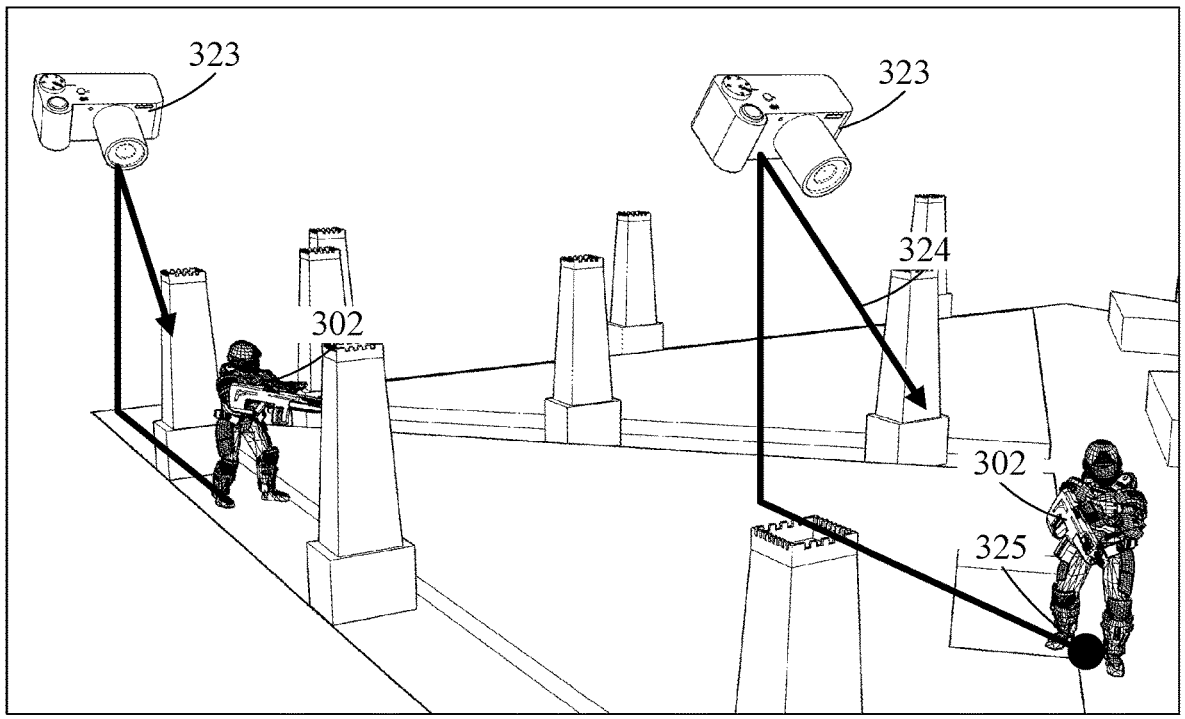
FIG. 7 is a schematic diagram of a camera model of a method for displaying a picture of a virtual environment according to another exemplary embodiment of this disclosure.

The camera model may be a model disposed in the virtual environment and configured to obtain a virtual environment picture. For example, the camera model may be disposed in different manners in the default case. For example, a position of the camera model may be bound to a three-dimensional model (the head or an eye) of the master virtual character, a photographing direction (observation direction) of the camera model is rotated along with rotation of the head or the eye of the master virtual character, and the position of the camera model is moved along with movement of the position of the master virtual character, so that the virtual environment may be photographed from a viewing angle of the master virtual character, to obtain a virtual environment picture of a first-person viewing angle of the master virtual character. If the position of the camera model is bound to a position with a fixed distance and a fixed height behind (the back) the master virtual character, the photographing direction (observation direction) of the camera model may be rotated along with rotation of a body of the master virtual character, and the position of the camera model may be moved along with movement of the position of the master virtual character, so that the virtual environment may be photographed from an over-the-shoulder viewing angle of the master virtual character, to obtain a virtual environment picture of the over-the-shoulder viewing angle of the master virtual character. If a relative position between the position of the camera model and the master virtual character is fixed, for example, the camera model may be located at a position that is ten meters far and ten meters high from the right below (or in a due south direction) of the master virtual character, the position of the camera model may be moved along with movement of the position of the master virtual character, but the photographing direction may not have changed along with rotation of the head or the body of the master virtual character, so that the virtual environment may be photographed from a third-person viewing angle, to obtain a virtual environment picture from the third-person viewing angle using the master virtual character as an observed object. For example, the camera model in this embodiment may photograph the virtual environment from the third-person viewing angle using the master virtual character as an observed object in the default case. For example, the camera model may be disposed in the due south direction with 10 meters far and 10 meters high from the position of the master virtual character, to photograph the master virtual character in a sloped down 45-degree observation direction. If the position of the master virtual character is (0, 0, 0), the position of the camera model may be (0, −10, 10). For example, as shown in FIG. 7, no matter which position in the virtual environment the master virtual character 302 moves to, a relative position between the camera model 323 and the master virtual character 302 may be fixed, and the photographing direction of the camera model 323 does not change along with an orientation of the master virtual character 302. An observation center of the camera model 323 may be an intersection point 325 of a ray emitted from the position of the camera model in the observation direction 324 and the virtual environment, namely, the position of the master virtual character 302. For example, FIG. 7 is a picture of the camera model in the virtual environment displayed in a perspective manner. Distances from the two camera models 323 to a perspective point may be different, so that the photographing directions (observation directions) of the camera models seen in the picture may be slightly different, but the photographing directions (observation directions) of the camera models in the virtual environment are actually the same. FIG. 7 is merely used for describing a position relationship between the camera model and the master virtual character, and the camera model is not displayed in an actual virtual environment picture.

For example, in the default case, the camera model may follow and photograph the master virtual character by using the master virtual character as the observation center. However, when the user performs viewing angle movement or conversion, the user may manually change the position of the camera model in the virtual environment, or the client may automatically adjust the position of the camera model according to the position of the target virtual character, to display a more complete target virtual character on the client. For example, the method for changing the camera model to obtain different virtual environment pictures may be: changing a horizontal coordinate of the camera model, changing a height of the camera model, and changing the observation direction of the camera model. When the horizontal coordinate of the camera model is changed, the observation position (the observation center in the virtual environment picture) of the camera model may be changed, so as to obtain a new virtual environment picture. Change of the horizontal coordinate may only change the observation position and may not change a size of a field of view in the virtual environment picture. When the height of the camera model is changed, the observation position (the observation center in the virtual environment picture) of the camera model may not be changed, and the size of the field of view of the camera model is changed. A greater height of the camera model may indicate a wider field of view and a larger range of virtual environment displayed in the obtained virtual environment picture. When a pitch angle (an angle in a vertical direction) of the camera model is changed, both the observation position and the size of the field of view of the camera model may be changed, and when a deflection angle (an angle in a horizontal direction) of the camera model is changed, only the observation position of the camera model may be changed, and the size of the field of view may not be changed.

For example, in this embodiment, different virtual environment pictures may be obtained by controlling the horizontal coordinate of the camera model in the virtual environment, to cause the virtual environment picture to display a more complete target virtual character.

For example, the height of the camera model may be further increased while changing the horizontal coordinate of the camera model, to further enlarge the field of view in the virtual environment picture, thereby displaying the target virtual character more completely.

For example, the virtual environment picture may be further caused to display a more complete target virtual character by changing at least one of a focus length, the height, the deflection angle, and the pitch angle of the camera model. For example, the field of view of the camera model is enlarged by adjusting the focus length of the camera model, the field of view of the camera model is enlarged by increasing the height of the camera model, and the pitch angle and the deflection angle of the camera model are controlled to offset toward a direction pointed by a direction ability indicator to cause the virtual environment picture to display a more complete target virtual character. For example, the client may use any one or more of the methods for changing the camera model provided above to cause the virtual environment picture to display a more complete target virtual character.

The offset is a distance and a direction moved by the camera model. The offset is a distance and a direction that the camera model offsets from a default position, and the default position is the position of the camera model in the default case. For example, if the camera model is bound to use the master virtual character as a photographed object (use the position of the master virtual character as the observation center), the default position of the camera model is determined according to the position of the master virtual character. For example, if a ground coordinate system is established, the offset is a direction vector pointing from the default position to an offset position. For example, if the camera model moves from the default position (the second camera position) (0, 0) to the third camera position (1, 1), the offset is (1, 1).

For example, the client changes the horizontal coordinate position of the camera model in the virtual environment according to the offset, to cause the camera model to move from the second camera position to the third camera position. For example, the client determines a destination position (the third camera position) of this offsetting of the camera model according to the offset. For example, the second camera position may be the default position of the camera model, or may be a position of the camera model after one offsetting has been occurred. If the second camera position is a position of the camera model after offsetting has been occurred, a total offset of the camera model offsetting to the third camera position is equal to a sum of a first offset of the camera model offsetting from the default position to the second camera position and a second offset offsetting from the second camera position to the third camera position.

The first virtual environment picture is acquired by the camera model at the first camera position, and an observation center thereof is the first observation position. The second virtual environment picture is acquired by the camera model at the second camera position, and an observation center thereof is the second observation position. The third virtual environment picture is acquired by the camera model at the third camera position, and an observation center thereof is the third observation position.

For example, an offset destination of the camera model may be determined according to the offset, and the camera model may then be controlled to move slowly from an offset starting point to the offset destination according to a preset movement manner, to cause virtual environment pictures displayed on the client to be continuous movement pictures rather than suddenly jumped pictures.

For example, the camera model offsets from the second camera position to the third camera position in a specified movement manner, and the specified movement manner may include any one of uniform motion, difference-based motion, and smooth damping motion.

For example, to cause the virtual environment pictures displayed on the client to be continuous in an offsetting process of the camera model, the camera model does not directly jump from the second camera position to the third camera position, the camera model may pass through a plurality of frames of pictures when moving from the second camera position to the third camera position, and the client may calculate a position to which the camera model is to move in each frame of picture by using different movement manners, to obtain the frame of picture according to the camera model at the position.

For example, the movement manner may be a uniform motion, and the uniform motion may refer to a case that the camera model is controlled to move the third camera position at a constant speed. For example, if the offset of the camera model is 10 meters and the client needs to control the camera model to move to a target position after 100 frames of pictures, the camera model may need to move 0.1 meter in each frame of picture.

For example, the movement manner may be alternatively difference-based motion. The difference-based motion determines the position of the camera model in each frame of picture according to a current position, the target position, and a movement ratio of the camera model. For example, if the movement ratio is set to 0.1, the client may calculate a difference between a position of the camera model in the last frame of picture and the target position, and then controls the camera model to move toward the target position by a distance that is 0.1 times of the difference. If the target position is 10 and the current position is 0, the camera model may move by 10*0.1=1 in a next frame to reach a position of 1, moves by (10−1)*0.1=0.9 in still next frame to reach a position of 1.9, and moves by (10−1.9)*0.1=0.81 in yet next frame to reach a position of 2.71. By performing movement in this manner, the camera model can never reach the target position and can only infinitely approach the target position. Therefore, the movement ratio may be set to change from 0 to 1, and the camera model may move to the target position when the movement ratio is set to 1. The difference-based motion may be based on determining a movement distance according to a distance difference and a movement ratio.

For example, the movement manner may be alternatively smooth damping motion. The smooth damping motion may be determined based on a movement distance according to a given movement time and a smooth function. The smooth function may be a black box function. The smooth function is a function similar to a spring damper.

Step 2033-2: Display the third virtual environment picture in response to that the camera model acquires the third virtual environment picture at the third camera position.

For example, after the camera model moves to the third camera position, the client may acquire a picture of the virtual environment by using the camera model to obtain the third virtual environment picture.

Figure 8:
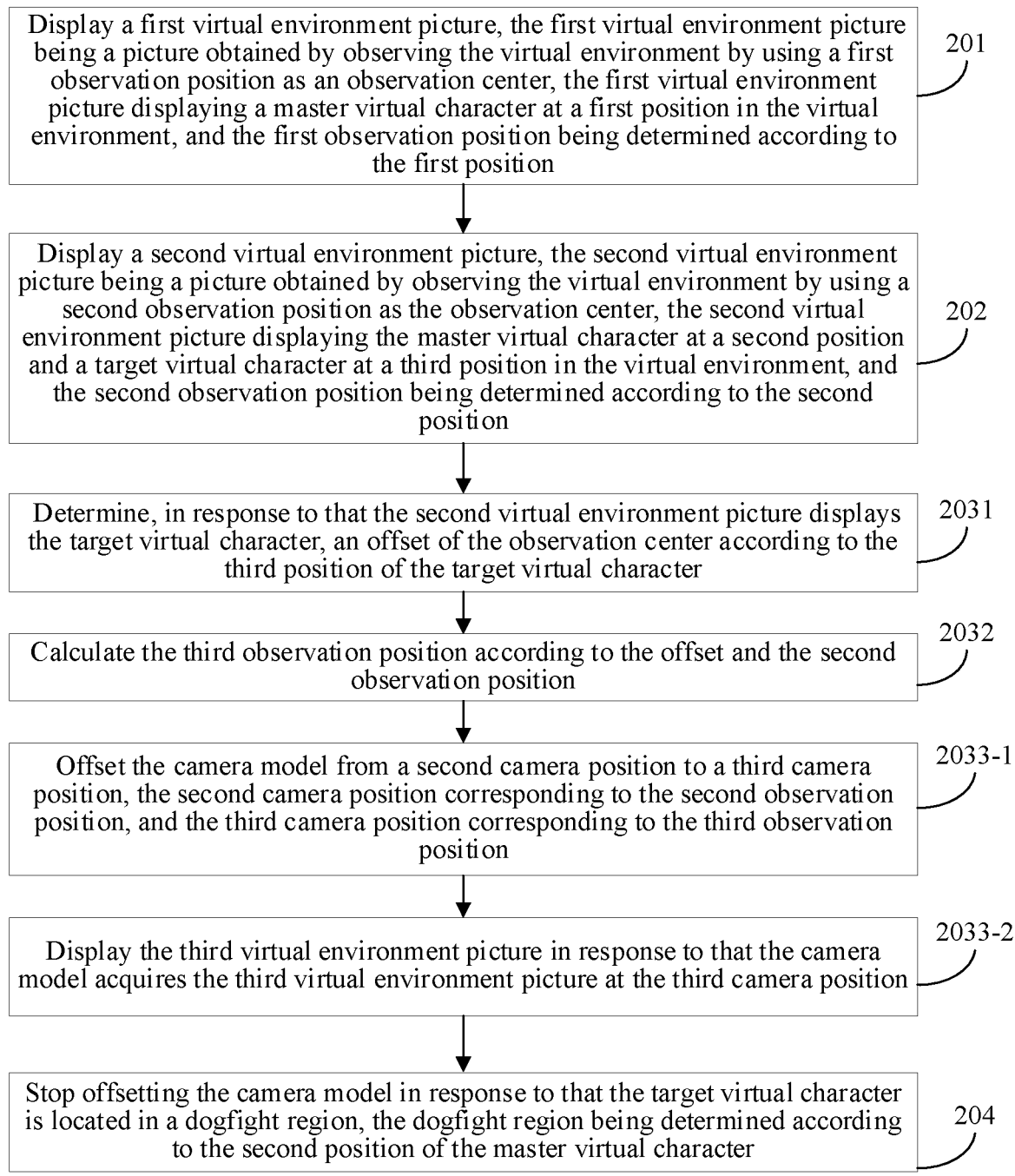
FIG. 8 is a method flowchart of a method for displaying a picture of a virtual environment according to another exemplary embodiment of this disclosure.

For example, when the target virtual character approaches the master virtual character, to prevent the virtual environment picture from shaking greatly due to the offset of the observation center and influencing user's watching when the target virtual character and the master virtual character perform a close quarter battle, the client may further stop the offset of the observation center when the target virtual character approaches the master virtual character, and as shown in FIG. 8, step 204 is further included after step 203.

Step 204: Stop offsetting the camera model in response to that the target virtual character is located in a dogfight region, the dogfight region being determined according to the second position of the master virtual character.

For example, the dogfight region may be a region close to the master virtual character, the dogfight region is a region range determined by using the position of the master virtual character as a center, and a shape of the dogfight region may be random such as a circle or a square. For example, the dogfight region may be a circular region using the position of the master virtual character as a center of a circle. For example, the dogfight region may be located in the target region, and the target region includes the dogfight region. That is, the dogfight region may be both a dogfight region and a target region.

Figure 9:
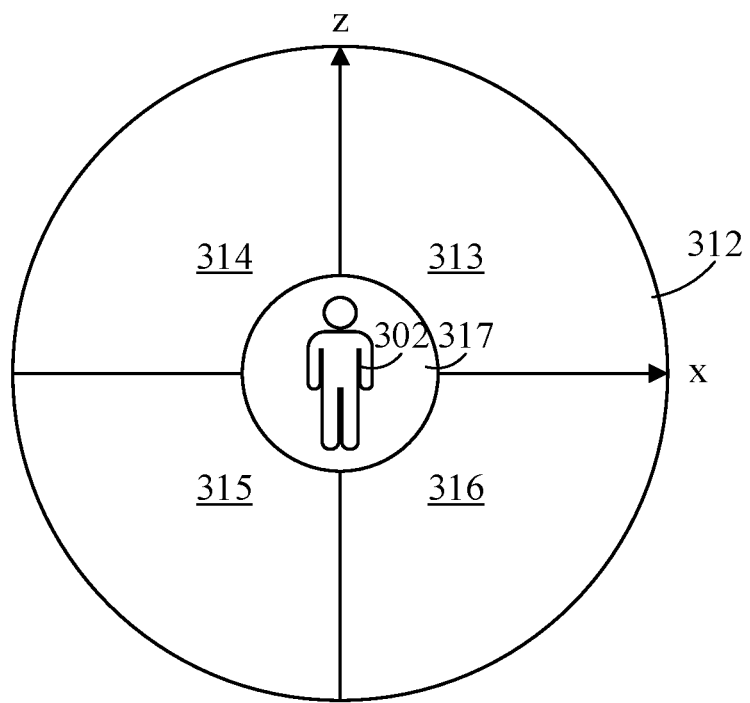
FIG. 9 is a schematic diagram of a dogfight region of a method for displaying a picture of a virtual environment according to another exemplary embodiment of this disclosure.

For example, as shown in FIG. 9, a dogfight region 317 using the second position of the master virtual character 302 as a center of a circle may be included in the target region 312.

For example, when the target virtual character may be located in the target region, the client may calculate an offset of the observation center according to a position of the target virtual character in the target region, and control the camera model to offset to a target camera position (the third camera position) according to the offset. That is, the camera model may move continuously and slowly. When the target virtual character enters the dogfight region, to ensure the stability of the virtual environment picture, no matter whether the camera model moves to the target camera position, the camera model may immediately stop offsetting. That is, the camera model may not offset along with the position of the target virtual character in the target region, and always keep an existing offset result unchanged.

For example, stopping offsetting the camera model may refer to that: the camera model no longer generates a new offset according to the position of the target virtual character, but the default camera position of the camera model may still change along with changes of the position of the master virtual character, and a final position of the camera model may be the default camera position plus an offset that has been generated by the current camera model.

For example, according to the position of the target virtual character in the target region, the camera model may offset from the default camera position (the second camera position) (0, 0) to the third camera position (3, 3). When the camera model offsets to a position of (2, 2), the target virtual character may enter the dogfight region, the camera model may stop offsetting and may no longer offset to the third camera position, and the offset of the camera model in this case may be (2, 2)−(0, 0)=(2, 2). If the position of the master virtual character changes and the default camera position changes from (0, 0) to (5, 5), the position of the camera model in this case may be (5, 5)+(2, 2)=(7, 7). That is, the camera model may correspondingly move to a position of (7, 7) according to the movement of the position of the master virtual character.

Based on the above, according to the method of this embodiment, the movement of the observation center may be implemented by moving the camera model, and the observation center may be moved from the second observation position to the third observation position by moving the camera model from the second camera position to the third camera position, to cause the camera model to perform photographing by using the third observation position at the third camera position, to obtain the third virtual environment picture.

According to the method provided in this embodiment, the movement of the camera model may be a smooth process, and the camera model may be moved in a plurality of movement manners.

According to the method provided in this embodiment, when a distance between the enemy virtual character and the master virtual character is relatively close, offsetting of the camera model may be stopped immediately. That is, offsetting of the observation center may be stopped, to prevent the virtual environment picture from shaking greatly due to the offsetting of the observation center and influencing the user to control the master virtual character to perform a close quarter battle.

For example, a method for setting the offset to 0 is further provided when the target virtual character no longer exists in the target region.

Figure 10:
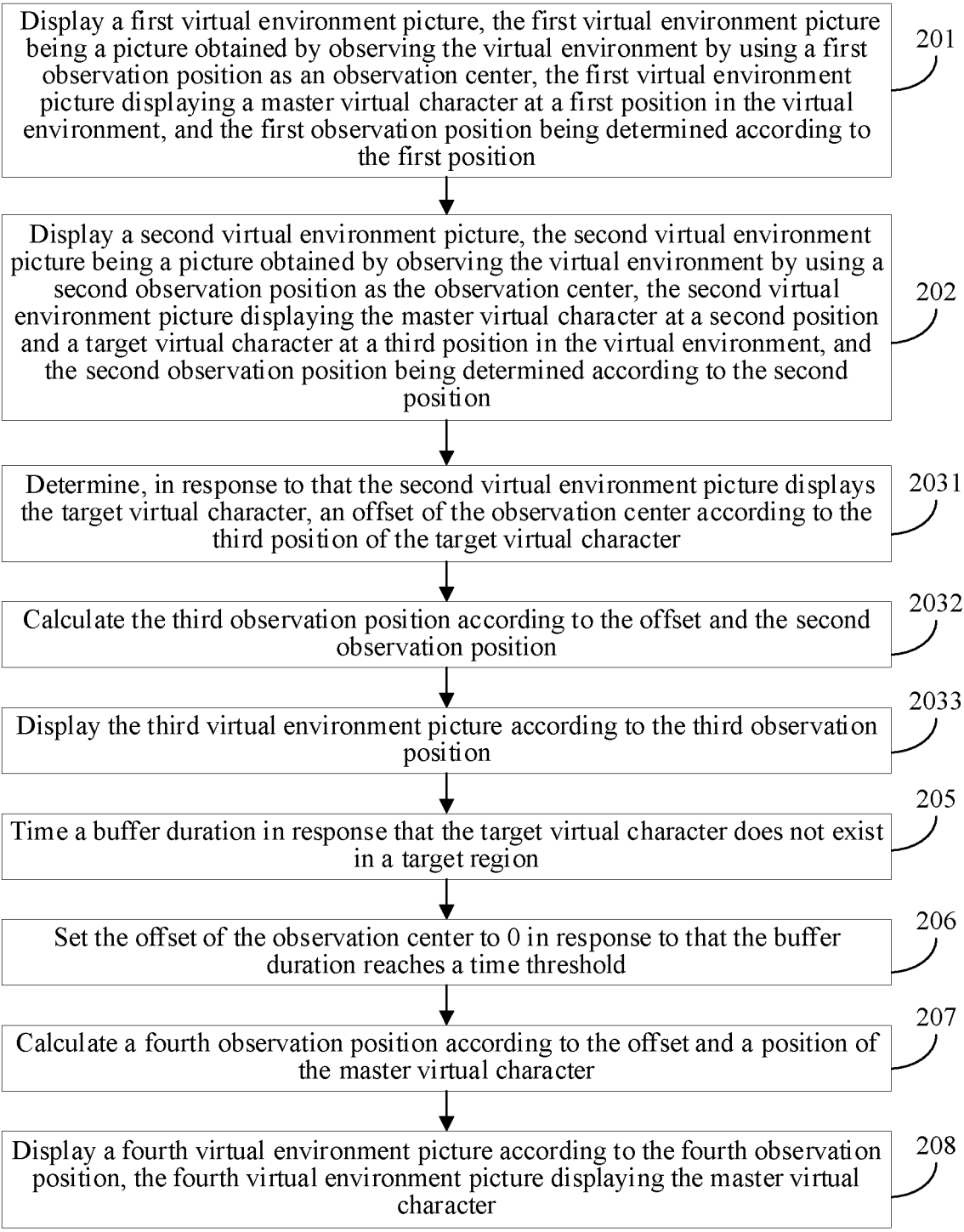
FIG. 10 is a method flowchart of a method for displaying a picture of a virtual environment according to another exemplary embodiment of this disclosure.

FIG. 10 is a flowchart of a method for displaying a picture of a virtual environment according to an exemplary embodiment of this application. The method may be performed by a client run on any terminal in FIG. 1, and the client may be a client supporting a virtual environment. Based on the exemplary embodiment shown in FIG. 4, after step 2033, step 205 to step 208 are further included.

Step 205: Time a buffer duration in response that the target virtual character does not exist in the target region.

For example, after the observation center offsets since the target virtual character enters the target region, the client may periodically detect whether the target virtual character exists in the target region, and when the target virtual character does not exist in the target region, the client may perform buffer timing (time a buffer duration).

Step 206: Set the offset of the observation center to 0 in response to that the buffer duration reaches a time threshold.

For example, if the target virtual character does not exist in the target region in a period of time (the time threshold), the client may set the offset of the observation center to 0, to cause the camera model to return to a camera position in the default case, so as to cause the observation center to return a default observation position again.

For example, if after the client times a buffer duration and before the buffer duration reaches the time threshold, the target virtual character appears in the target region again, the client may stop buffer timing, and calculate the offset of the observation center again according to the position of the target virtual character to control the observation center to offset.

Step 207: Calculate a fourth observation position according to the offset and a position of the master virtual character.

For example, since the offset has been set to 0, the fourth observation position may be a default observation position corresponding to a current position of the master virtual character. The client moves the camera model back to a fourth camera position corresponding to the fourth observation position, to cause the camera model to obtain the fourth virtual environment picture by using the fourth observation position as the observation center.

Step 208: Display a fourth virtual environment picture according to the fourth observation position, the fourth virtual environment picture displaying the master virtual character.

For example, the fourth virtual environment picture no longer includes the target virtual character.

Based on the above, according to the method provided in this embodiment, when the enemy virtual character does not exist in the target region, buffer timing of camera offsetting may be performed, and when the enemy virtual character does not exist in the target region in a period of time, the offset of a lens is set to 0, and the lens may be controlled to return a normal position to display a virtual environment picture normally.

For example, an exemplary embodiment in which the method for displaying a picture of a virtual environment provided in this application is applicable to a MOBA game is provided.

Figure 11:
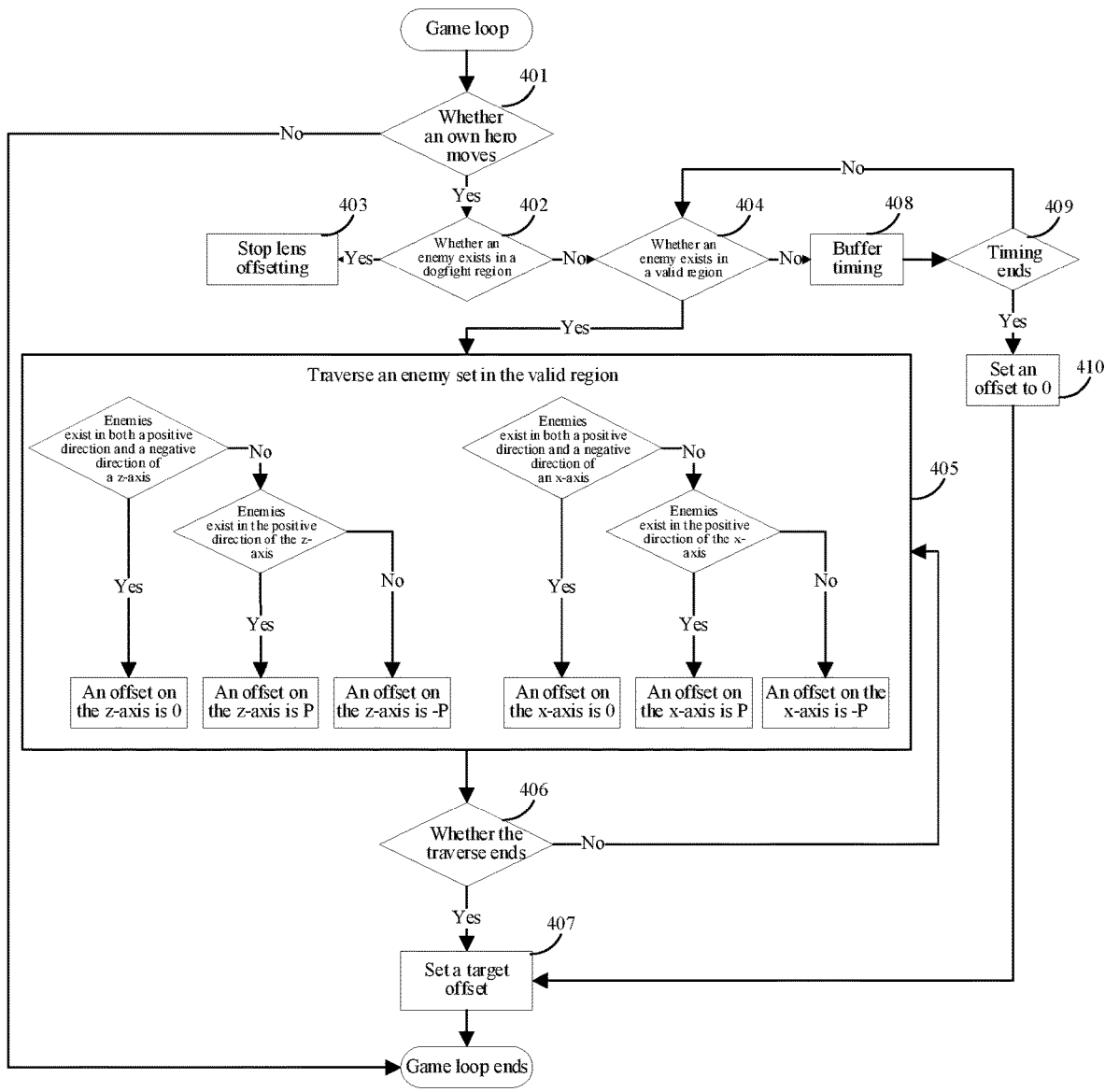
FIG. 11 is a method flowchart of a method for displaying a picture of a virtual environment according to another exemplary embodiment of this disclosure.

FIG. 11 is a flowchart of a method for displaying a picture of a virtual environment according to an exemplary embodiment of this application. The method may be performed by a client run on any terminal in FIG. 1, and the client may be a client supporting a virtual environment. The method includes the following steps.

Step 401: The client determines whether an own hero (a master virtual character) moves.

For example, when the master virtual character moves, the client may perform step 402, to detect whether there is an enemy (a target virtual character) in a dogfight region of the master virtual character.

Step 402: The client detects whether an enemy exists in a dogfight region, and performs step 403 if an enemy exists; otherwise, performs step 404.

Step 403: The client controls a lens (a camera model) to stop offsetting.

For example, if the target virtual character exists in the dogfight region of the master virtual character, the client may control the lens to stop offsetting, to prevent shaking of the virtual environment picture from influencing user's observation.

Step 404: The client determines whether an enemy exists in a valid region (a target region), and performs step 405 if an enemy exists; otherwise, performs step 408, Step 405: The client traverses an enemy set in the valid region to determine an offset.

For example, the client may determine whether there are enemies in both a positive direction and a negative direction of a z-axis of the target region. If the enemies exist in both the two directions, a value of the offset on a longitudinal axis may be 0; if the enemies do not exist in both the two directions, the client may further determine whether the enemies exist in the positive direction of the z-axis; and if the enemies exist in the positive direction, the value of the offset on the longitudinal axis may be P, and otherwise, the value of the offset on the longitudinal axis may be –P. For example, the client may determine whether there are enemies in both a positive direction and a negative direction of an x-axis of the target region, if the enemies exist in both the two directions, a value of the offset on a horizontal axis may be 0. If the enemies do not exist in both the two directions, the client may further determine whether the enemies exist in the positive direction of the x-axis, and if the enemies exist in the positive direction, the value of the offset on the horizontal axis may be P, and otherwise, the value of the offset on the horizontal axis may be –P, where P is any real number.

Step 406: The client determines whether the traverse ends, and performs step 407 if the traverse ends; otherwise, performs step 405.

Step 407: The client sets a target offset (offset).

The client controls the camera model to offset according to the target offset.

Step 408: The client starts buffer timing.

For example, if no enemy exists in the valid region, the client may start buffer timing, and if no enemy exists in the valid region in a period of time, the client may set the offset to 0.

Step 409: The client determines whether the buffer timing ends, and performs step 410 if the buffer timing ends; otherwise, performs step 404.

For example, the client may continuously detect whether an enemy appears in the valid region in the buffer timing process, and if no enemy appears all the time, step 410 may be performed.

Step 410: The client sets the offset to 0.

For example, the client may set the offset to 0, and control the camera model to return a default camera position.

Based on the above, according to the method provided in this embodiment, when the master virtual character moves, detection of whether an enemy appears in the valid region and the dogfight region may be started, and when an enemy appears in the valid region, the lends may be controlled to offset according to a position of the enemy in the valid region, to display a complete enemy on the virtual environment picture. Buffer timing is performed when no enemy exists in the target region, and when no enemy appears in the valid region all the time after the buffer timing is ended, the offset may be set to 0, to control the lens to return a default position, and the master virtual character may still be used as the observation center of the virtual environment picture.

The foregoing method is described based on a game application scenario in the foregoing embodiments, and the following is an exemplary description of the foregoing method based on a military simulation application scenario.

A simulation technology refers to a model technology in which a system behavior or process is reflected by using software and hardware through an experiment of simulating a real world.

A military simulation program refers to a program specially constructed for military application by using the simulation technology, which performs quantitative analysis on battle elements such as sea, land, and air, weapon equipment performance, battle action, and the like, to accurately simulate a battlefield environment, and present a battlefield status, thereby achieving battle system evaluation and decision aids.

In an example, soldiers set up a virtual battlefield on a terminal on which the military simulation program is located, and fight in teams. A soldier controls the virtual object in the virtual battlefield environment to perform at least one operation of standing, crouching, sitting, going supine, going prone, lying on the side, walking, running, climbing, driving, shooting, throwing, attacking, getting hurt, detecting, close combat and other actions in the virtual battlefield environment. The virtual battlefield environment may include at least one natural form of a plain, a mountain, a plateau, a basin, a desert, a river, a lake, a sea, and vegetation, and a place form such as a building, a vehicle, a ruin, and a training ground. The virtual object may include a virtual figure, a virtual animal, a cartoon figure, or the like.

Each virtual object owns a shape and a volume in a three-dimensional virtual environment, and occupies some space in the three-dimensional virtual environment.

Based on the above, in an example, a soldier A may control a virtual object a to move in the virtual environment, when a soldier B controls a virtual object b to enters a target region of the virtual object a, a client of the soldier A controls to offset the observation center to display the complete virtual object b on the client of the soldier A, to help the soldier A observe trends of the virtual object b to further attack or defend against the virtual object.

Based on the above, in this embodiment, the method for displaying a picture of a virtual environment is applicable to a military simulation program, so that the soldier may better observe an enemy, and the soldier obtains better training.

The following describes apparatus embodiments of this application. For details not described in detail in the apparatus embodiments, reference may be made to the foregoing method embodiments.

Figure 12:
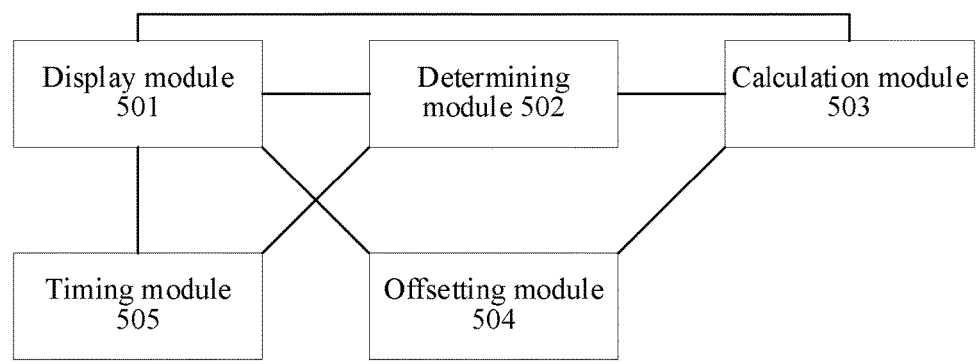
FIG. 12 is a block diagram of an apparatus for displaying a picture of a virtual environment according to another exemplary embodiment of this disclosure.

FIG. 12 is a block diagram of an apparatus for displaying a picture of a virtual environment according to an exemplary embodiment of this application. The apparatus includes:

a display module 501, configured to display a first virtual environment picture, the first virtual environment picture being a picture obtained by observing the virtual environment by using a first observation position as an observation center, the first virtual environment picture displaying a master virtual character at a first position in the virtual environment, and the first observation position being determined according to the first position;

the display module 501 being further configured to display a second virtual environment picture, the second virtual environment picture being a picture obtained by observing the virtual environment by using a second observation position as the observation center, the second virtual environment picture displaying the master virtual character at a second position and a target virtual character at a third position in the virtual environment, and the second observation position being determined according to the second position; and the display module 501 being further configured to display a third virtual environment picture in response to that the second virtual environment picture displays the target virtual character, the third virtual environment picture being a picture obtained by observing the virtual environment by using a third observation position as the observation center, the third virtual environment picture displaying the master virtual character at the second position and the target virtual character at the third position in the virtual environment, and the third observation position being determined according to the second position and the third position.

In an optional embodiment, the apparatus further includes:

a determining module 502, configured to determine, in response to that the second virtual environment picture displays the target virtual character, an offset of the observation center according to the third position of the target virtual character;

a calculation module 503, configured to calculate the third observation position according to the offset and the second observation position; and the display module 501 being further configured to display the third virtual environment picture according to the third observation position.

In an optional embodiment, the determining module 502 is further configured to determine, in response to that the target virtual character is located in a target region, the offset of the observation center according to a position of the third position in the target region, the target region being a region determined according to the second position of the master virtual character.

In an optional embodiment, the target region includes a region centered on the second position, and the target region is divided into a first quadrant region, a second quadrant region, a third quadrant region, and a fourth quadrant region by a rectangular coordinate system with an x-axis and a z-axis that is established by using the second position as a coordinate origin;

the determining module 502 is further configured to determine, in response to that the third position is located in a right region of the z-axis, a horizontal coordinate of the offset as A, A being a positive number, the right region of the z-axis including: a positive semi-axis of the x-axis, the first quadrant region, and the fourth quadrant region;

the determining module 502 is further configured to determine, in response to that the third position is located in a left region of the z-axis, the horizontal coordinate of the offset as −B, B being a positive number, the left region of the z-axis including: a negative semi-axis of the x-axis, the second quadrant region, and the third quadrant region;

the determining module 502 is further configured to determine, in response to that the third position is located in an upper region of the x-axis, a longitudinal coordinate of the offset as C, C being a positive number, the upper region of the x-axis including: a positive semi-axis of the z-axis, the first quadrant region, and the second quadrant region; and the determining module 502 is further configured to determine, in response to that the third position is located in a lower region of the x-axis, the longitudinal coordinate of the offset as −D, D being a positive number, the lower region of the x-axis including: a negative semi-axis of the z-axis, the third quadrant region, and the fourth quadrant region.

In an optional embodiment, the target virtual character may include at least two virtual characters; and the determining module 502 is further configured to determine the horizontal coordinate of the offset as 0 in response to that at least one of the target virtual characters is located in the right region of the z-axis and at least one of the target virtual characters is located in the left region of the z-axis.

In an optional embodiment, the target virtual character may include at least two virtual characters; and the determining module 502 is further configured to determine the longitudinal coordinate of the offset as 0 in response to that at least one of the target virtual characters is located in the upper region of the x-axis and at least one of the target virtual characters is located in the lower region of the x-axis.

In an example embodiment, the first virtual environment picture may be a picture of the virtual environment acquired by a camera model disposed at a first camera position in the virtual environment, and the observation center is an intersection point of a ray emitted from a position of the camera model in an observation direction and the virtual environment; and the apparatus may further include:

an offsetting module 504, configured to offset the camera model from a second camera position to a third camera position, the second camera position corresponding to the second observation position, and the third camera position corresponding to the third observation position; and the display module 501 being further configured to display the third virtual environment picture in response to that the camera model acquires the third virtual environment picture at the third camera position.

In an example embodiment, the offsetting module 504 may be further configured to offset the camera model from the second camera position to the third camera position in a specified movement manner, the specified movement manner including any one of uniform motion, differential motion, and smooth damping motion.

In an example embodiment, the offsetting module 504 is further configured to stop offsetting the camera model in response to that the target virtual character is located in a dogfight region, the dogfight region being determined according to the second position of the master virtual character.

In an example embodiment, the apparatus may further include:

a timing module 505, configured to time a buffer duration in response that the target virtual character does not exist in the target region;

the determining module 502 being configured to set the offset of the observation center to 0 in response to that the buffer duration reaches a time threshold;

the calculation module 503 being configured to calculate a fourth observation position according to the offset and a position of the master virtual character; and the display module 501 being further configured to display a fourth virtual environment picture according to the fourth observation position, the fourth virtual environment picture displaying the master virtual character.

In an example embodiment, the display module 501 may be s further configured to display the second virtual environment picture in response to that the master virtual character moves to the second position;

or the display module 501 may be further configured to display the second virtual environment picture in response to that the target virtual character moves to the third position.

The apparatus for displaying a picture of a virtual environment provided in the foregoing embodiments is illustrated with an example of division of the foregoing functional modules. During actual application, the functions may be allocated to and completed by different functional modules according to requirements, that is, the internal structure of the device is divided into different functional modules, to implement all or some of the functions described above. In addition, the apparatus for displaying a picture of a virtual environment provided in the foregoing embodiment belongs to the same concept as the method embodiment for displaying a picture of a virtual environment. For a specific implementation process of the apparatus, refer to the method embodiment. Details are not described herein again.

This application further provides a terminal, including a processor and a memory, the memory storing at least one instruction, the at least one instruction being loaded and executed by the processor to implement the method for displaying a picture of a virtual environment according to the foregoing method embodiments. The terminal may be a terminal provided in FIG. 13 below.

Figure 13:
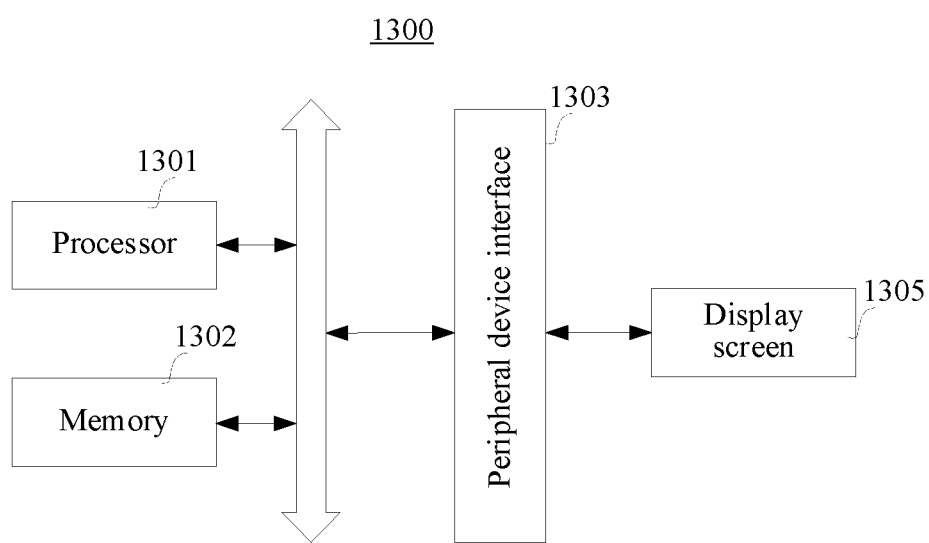
FIG. 13 is a block diagram of a terminal according to another exemplary embodiment of this disclosure.

FIG. 13 shows a structural block diagram of a terminal 1300 according to an exemplary embodiment of this application. The terminal 1300 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1300 may also be referred to as another name such as user equipment, a portable terminal, a laptop terminal, or a desktop terminal.

Generally, the terminal 1300 includes a processor 1301 a memory 1302, and a display screen 1305.

The processor 1301 may include one or more processing cores, for example, a 4-core processor or an 8-core processor. The processor 1301 may be implemented in at least one hardware form of a digital signal processor (DSP), a field-programmable gate array (FPGA), and a programmable logic array (PLA). The processor 1301 may alternatively include a main processor and a coprocessor. The main processor is a processor configured to process data in an active state, also referred to as a central processing unit (CPU). The coprocessor is a low-power processor configured to process data in a standby state. In some embodiments, the processor 1301 may be integrated with a graphics processing unit (GPU). The GPU is configured to render and draw content that needs to be displayed on a display screen. In some embodiments, the processor 1301 may further include an artificial intelligence (AI) processor. The AI processor is configured to process a computing operation related to machine learning.

The memory 1302 may include one or more computer-readable storage media. The computer-readable storage medium may be non-transient. The memory 1302 may further include a high-speed random access memory and a non-volatile memory, for example, one or more magnetic disk storage devices or flash storage devices. In some embodiments, a non-transitory computer-readable storage medium in the memory 1302 is configured to store at least one instruction, the at least one instruction being configured to be executed by the processor 1301 to implement the method for displaying a picture of a virtual environment provided in the method embodiments of this application.

The display screen 1305 may be configured to display a user interface (UI). The UI may include a graph, a text, an icon, a video, and any combination thereof. When the display screen 1305 is a touch display screen, the display screen 1305 is further capable of acquiring touch signals on or above a surface of the display screen 1305. The touch signal may be used as a control signal to be inputted to the processor 1301 for processing. In this case, the display screen 1305 may be further configured to provide a virtual button and/or a virtual keyboard that are/is also referred to as a soft button and/or a soft keyboard. In some embodiments, there may be one display screen 1305 disposed on a front panel of the terminal 1300. In some other embodiments, there may be at least two display screens 1305 respectively disposed on different surfaces of the terminal 1300 or designed in a foldable shape. In still some other embodiments, the display screen 1305 may be a flexible display screen disposed on a curved surface or a folded surface of the terminal 1300. Even, the display screen 1305 may further be set to have a non-rectangular irregular graph, that is, a special-shaped screen. The display screen 1305 may be prepared by using materials such as a liquid crystal display (LCD), an organic light-emitting diode (OLED), or the like.

A person skilled in the art may understand that the structure shown in FIG. 13 does not constitute a limitation to the terminal 1300, and the terminal may include more components or fewer components than those shown in the figure, or some components may be combined, or a different component deployment may be used.

The memory may further include one or more programs. The one or more programs are stored in the memory and include steps for performing the method for displaying a picture of a virtual environment provided in the embodiments of this application.

This application may provide a computer-readable storage medium, storing at least one instruction, the at least one instruction being loaded and executed by a processor to implement the method for displaying a picture of a virtual environment provided in the foregoing method embodiments.

This application may further provide a computer program product or a computer program. The computer program product or the computer program includes computer instructions, and the computer instructions are stored in a computer-readable storage medium. A processor of a computer device reads the computer instructions from the computer-readable storage medium, and executes the computer instructions to cause the computer device to perform the method for displaying a picture of a virtual environment provided in the foregoing optional implementations.

The sequence numbers of the foregoing embodiments of this application are merely for description purpose, and are not intended to indicate the preference among the embodiments.

A person of ordinary skill in the art may understand that all or some of the steps of the foregoing embodiments may be implemented by hardware, or may be implemented by a program instructing related hardware. The program may be stored in a computer-readable storage medium. The storage medium may be: a read-only memory (ROM), a magnetic disk, or an optical disc.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for displaying a picture of a virtual environment, performed by a computer device, the method comprising:
    displaying a first virtual environment picture, the first virtual environment picture being a picture obtained by observing the virtual environment by using a first observation position as an observation center, the first virtual environment picture displaying a master virtual character at a first position in the virtual environment, and the first observation position being determined according to the first position;
    displaying a second virtual environment picture in place of the first virtual environment picture, the second virtual environment picture being a picture obtained by observing the virtual environment by using a second observation position as the observation center, the second virtual environment picture displaying the master virtual character at a second position and a target virtual character at a third position in the virtual environment, and the second observation position being determined according to the second position; and
    displaying a third virtual environment picture in place of the second virtual environment picture and triggered by the target virtual character appearing in the second virtual environment picture, the third virtual environment picture being a picture obtained by observing the virtual environment by using a third observation position as the observation center, the third virtual environment picture displaying the master virtual character at the second position and the target virtual character at the third position in the virtual environment, and lithe third observation position being determined according to the second position and the third position, and the third observation position being a shifted position towards the target virtual character.

2. The method according to claim 1, wherein displaying the third virtual environment picture in response to that the second virtual environment picture displays the target virtual character comprises:
    determining, in response to that the second virtual environment picture displays the target virtual character, an offset of the observation center according to the third position of the target virtual character;
    calculating the third observation position according to the offset and the second observation position; and
    displaying the third virtual environment picture according to the third observation position.

3. The method according to claim 2, wherein determining, in response to that the second virtual environment picture displays the target virtual character, the offset of the observation center according to the third position of the target virtual character comprises:
    determining, in response to that the target virtual character is located in a target region, the offset of the observation center according to a target position of the third position in the target region, the target region being a region determined according to the second position of the master virtual character.

4. The method according to claim 3, wherein the target region comprises a region centered on the second position, and the target region is divided into a first quadrant region, a second quadrant region, a third quadrant region, and a fourth quadrant region by a rectangular coordinate system with an x-axis and a z-axis that is established by using the second position as a coordinate origin; and
    determining, in response to that the target virtual character is located in the target region, the offset of the observation center according to the target position of the third position in the target region comprises:
    determining, in response to that the third position is located in a right region of the z-axis, a horizontal coordinate of the offset as A, A being a positive number, the right region of the z-axis comprising: a positive semi-axis of the x-axis, the first quadrant region, and the fourth quadrant region;
    determining, in response to that the third position is located in a left region of the z-axis, the horizontal coordinate of the offset as −B, B being a positive number, the left region of the z-axis comprising a negative semi-axis of the x-axis, the second quadrant region, and the third quadrant region;
    determining, in response to that the third position is located in an upper region of the x-axis, a longitudinal coordinate of the offset as C, C being a positive number, the upper region of the x-axis comprising a positive semi-axis of the z-axis, the first quadrant region, and the second quadrant region; and
    determining, in response to that the third position is located in a lower region of the x-axis, the longitudinal coordinate of the offset as −D, D being a positive number, the lower region of the x-axis comprising a negative semi-axis of the z-axis, the third quadrant region, and the fourth quadrant region.

5. The method according to claim 4, wherein the target virtual character comprises at least two virtual characters; and
    determining, in response to that the third position is located in the right region of the z-axis, a horizontal coordinate of the offset as A; and determining, in response to that the third position is located in the left region of the z-axis, the horizontal coordinate of the offset as −B comprises:

determining the horizontal coordinate of the offset as 0 in response to that at least one of the target virtual characters is located in the right region of the z-axis and at least one of the target virtual characters is located in the left region of the z-axis.

6. The method according to claim 4, wherein the target virtual character comprises at least two virtual characters; and determining, in response to that the third position is located in an upper region of the x-axis, the longitudinal coordinate of the offset as C; and determining, in response to that the third position is located in the lower region of the x-axis, the longitudinal coordinate of the offset as −D comprises:

determining the longitudinal coordinate of the offset as 0 in response to that at least one of the target virtual characters is located in the upper region of the x-axis and at least one of the target virtual characters is located in the lower region of the x-axis.

7. The method according to claim 2, wherein the first virtual environment picture comprises a picture of the virtual environment acquired by a camera model disposed at a first camera position in the virtual environment, and the observation center comprises an intersection point of a ray emitted from a position of the camera model in an observation direction and the virtual environment; and displaying the third virtual environment picture according to the third observation position comprises:

offsetting the camera model from a second camera position to a third camera position, the second camera position corresponding to the second observation position, and the third camera position corresponding to the third observation position; and displaying the third virtual environment picture in response to that the camera model acquires the third virtual environment picture at the third camera position.

8. The method according to claim 7, wherein offsetting the camera model from the second camera position to the third camera position comprises:

offsetting the camera model from the second camera position to the third camera position in a specified movement manner, the specified movement manner comprising any one of uniform motion, difference-based motion, and smooth damping motion.

9. The method according to claim 7, wherein the method further comprises:

stopping offsetting the camera model in response to that the target virtual character is located in a dogfight region, the dogfight region being determined according to the second position of the master virtual character.

10. The method according to claim 3, wherein the method further comprises:

timing a buffer duration in response that the target virtual character does not exist in the target region;

setting the offset of the observation center to 0 in response to that the buffer duration reaches a time threshold;

calculating a fourth observation position according to the offset and a position of the master virtual character; and displaying a fourth virtual environment picture according to the fourth observation position, the fourth virtual environment picture displaying the master virtual character.

11. The method according to claim 1, wherein displaying the second virtual environment picture comprises:

displaying the second virtual environment picture in response to that the master virtual character moves to the second position;

or displaying the second virtual environment picture in response to that the target virtual character moves to the third position.

12. An apparatus for displaying a picture of a virtual environment, comprising a memory for storing computer instructions and a processor in communication with the memory and configured to execute the computer instructions to:

display a first virtual environment picture, the first virtual environment picture being a picture obtained by observing the virtual environment by using a first observation position as an observation center, the first virtual environment picture displaying a master virtual character at a first position in the virtual environment, and the first observation position being determined according to the first position;

display a second virtual environment picture in place of the first virtual environment picture, the second virtual environment picture being a picture obtained by observing the virtual environment by using a second observation position as the observation center, the second virtual environment picture displaying the master virtual character at a second position and a target virtual character at a third position in the virtual environment, and the second observation position being determined according to the second position; and display a third virtual environment picture in place of the second virtual environment picture and triggered by the target virtual character appearing in the second virtual environment picture displays the target virtual character, the third virtual environment picture being a picture obtained by observing the virtual environment by using a third observation position as the observation center, the third virtual environment picture displaying the master virtual character at the second position and the target virtual character at the third position in the virtual environment, and lithe third observation position being determined according to the second position and the third position, and the third observation position being a shifted position towards the target virtual character.

13. The apparatus according to claim 12, wherein the processor is further configured to execute the computer instructions to:

determine, in response to that the second virtual environment picture displays the target virtual character, an offset of the observation center according to the third position of the target virtual character;

calculate the third observation position according to the offset and the second observation position; and display the third virtual environment picture according to the third observation position.

14. The apparatus according to claim 13, where the processor is further configured to execute the computer instructions to determine the offset of the observation center by determining, in response to that the target virtual character is located in a target region, the offset of the observation center according to a position of the third position in the target region, the target region being a region determined according to the second position of the master virtual character.

15. The apparatus according to claim 14, wherein the target region comprises a region centered on the second position, and the target region is divided into a first quadrant region, a second quadrant region, a third quadrant region, and a fourth quadrant region by a rectangular coordinate system with an x-axis and a z-axis that is established by using the second position as a coordinate origin;

the processor is further configured to execute the computer instructions to:

determine, in response to that the third position is located in a right region of the z-axis, a horizontal coordinate of the offset as A, A being a positive number, the right region of the z-axis comprising: a positive semi-axis of the x-axis, the first quadrant region, and the fourth quadrant region;

determine, in response to that the third position is located in a left region of the z-axis, the horizontal coordinate of the offset as −B, B being a positive number, the left region of the z-axis comprising: a negative semi-axis of the x-axis, the second quadrant region, and the third quadrant region;

determine, in response to that the third position is located in an upper region of the x-axis, a longitudinal coordinate of the offset as C, C being a positive number, the upper region of the x-axis comprising: a positive semi-axis of the z-axis, the first quadrant region, and the second quadrant region; and determine, in response to that the third position is located in a lower region of the x-axis, the longitudinal coordinate of the offset as −D, D being a positive number, the lower region of the x-axis comprising: a negative semi-axis of the z-axis, the third quadrant region and the fourth quadrant region.

16. The apparatus according to claim 15, wherein the target virtual character comprises at least two target virtual characters; and processor is further configured to execute the computer instructions to determine the horizontal coordinate of the offset as 0 in response to that at least one of the at least two target virtual characters is located in the right region of the z-axis and at least one of the at least two target virtual characters is located in the left region of the z-axis.

17. The apparatus according to claim 15, wherein the target virtual character comprises at least two target virtual characters; and processor is further configured to execute the computer instructions to determine the longitudinal coordinate of the offset as 0 in response to that at least one of the at least two target virtual characters is located in the upper region of the x-axis and at least one of the at least two target virtual characters is located in the lower region of the x-axis.

18. A non-transitory computer-readable storage medium, storing at least one instruction, at least one program, a code set, or an instruction set, the at least one instruction, the at least one program, the code set, or the instruction set being loaded and executed by a processor to implement the method for displaying a picture of a virtual environment according to claim 1.

19. A non-transitory computer-readable storage medium, storing at least one instruction, at least one program, a code set, or an instruction set, the at least one instruction, the at least one program, the code set, or the instruction set being loaded and executed by a processor to implement the method for displaying a picture of a virtual environment according to claim 2.

20. A computer program product or a computer program, the computer program product or the computer program comprising computer instructions, the computer instructions being stored in a non-transitory computer-readable storage medium, a processor of a computer device reading the computer instructions from the non-transitory computer-readable storage medium, and the processor executing the computer instructions to cause the computer device to perform the method for displaying a picture of a virtual environment according to claim 1.

* * * * *

UNITED STATES PATENT AND TRADEMARK OFFICE
CERTIFICATE OF CORRECTION

PATENT NO. : 12,023,580 B2  
APPLICATION NO. : 17/514420  
DATED : July 2, 2024  
INVENTOR(S) : Jiacheng Wei et al.

Page 1 of 1

It is certified that error appears in the above-identified patent and that said Letters Patent is hereby corrected as shown below:

In the Claims

In Column 29, Claim 1, Line 63, delete "and lithe" and replace with --the--.

In Column 32, Claim 12, Line 41, delete "and lithe" and replace with --the--.

Signed and Sealed this  
Twenty-fourth Day of September, 2024

Katherine Kelly Vidal  
*Director of the United States Patent and Trademark Office*